United States Patent
Adams et al.

(10) Patent No.: US 10,346,757 B2
(45) Date of Patent: Jul. 9, 2019

(54) SYSTEMS AND METHODS FOR PARALLELIZING BAYESIAN OPTIMIZATION

(71) Applicants: Universite de Sherbrooke, Sherbrooke (CA); President and Fellows of Harvard College, Cambridge, MA (US); Governing Council of the Univ. of Toronto, The, Toronto (CA)

(72) Inventors: Ryan P. Adams, Somerville, MA (US); Roland Jasper Snoek, Cambridge, MA (US); Hugo Larochelle, Sherbrooke (CA)

(73) Assignees: President and Fellows of Harvard College, Cambridge, MA (US); Socpra Sciences ET Genie S.E.C., Sherbrooke, Quebec (CA); The Governing Council of the University of Toronto, Toronto, Ontario (CA)

( * ) Notice: Subject to any disclaimer, the term of this patent is extended or adjusted under 35 U.S.C. 154(b) by 914 days.

(21) Appl. No.: 14/291,337

(22) Filed: May 30, 2014

(65) Prior Publication Data
US 2016/0328653 A1    Nov. 10, 2016

Related U.S. Application Data

(60) Provisional application No. 61/910,837, filed on Dec. 2, 2013, provisional application No. 61/829,604, filed (Continued)

(51) Int. Cl.
  *G06N 5/04* (2006.01)
  *G06N 7/00* (2006.01)
  (Continued)

(52) U.S. Cl.
  CPC ............ *G06N 5/048* (2013.01); *G06F 17/11* (2013.01); *G06N 7/005* (2013.01); *G06N 20/00* (2019.01)

(58) Field of Classification Search
  None
  See application file for complete search history.

(56) References Cited

U.S. PATENT DOCUMENTS

| | | |
|---|---|---|
| 7,428,514 B2 | 9/2008 | Jin et al. |
| 9,858,529 B2 | 1/2018 | Adams et al. |

(Continued)

OTHER PUBLICATIONS

Bergstra, J. et al. (2011). "Implementations of algorithms for hyper-parameter optimization". In NIPS Workshop on Bayesian optimization. 5 pages.*

(Continued)

*Primary Examiner* — Kamran Afshar
*Assistant Examiner* — Benjamin J Buss
(74) *Attorney, Agent, or Firm* — Wolf, Greenfield & Sacks, P.C.

(57) ABSTRACT

Techniques for use in connection with performing optimization using an objective function. The techniques include using at least one computer hardware processor to perform: beginning evaluation of the objective function at a first point; before evaluating the objective function at the first point is completed: identifying, based on likelihoods of potential outcomes of evaluating the objective function at the first point, a second point different from the first point at which to evaluate the objective function; and beginning evaluation of the objective function at the second point.

21 Claims, 9 Drawing Sheets

Related U.S. Application Data on May 31, 2013, provisional application No. 61/829,090, filed on May 30, 2013.

(51) Int. Cl.
  *G06F 17/11* (2006.01)
  *G06N 20/00* (2019.01)

(56) References Cited

U.S. PATENT DOCUMENTS

| | | | |
|---|---|---|---|
| 9,864,953 | B2 | 1/2018 | Adams et al. |
| 2003/0167265 | A1 | 9/2003 | Corynen |
| 2006/0136205 | A1 | 6/2006 | Song |
| 2006/0200333 | A1* | 9/2006 | Dalal .................. G06F 17/5009 703/17 |
| 2008/0312895 | A1 | 12/2008 | Sastry et al. |
| 2010/0131440 | A1 | 5/2010 | Chen et al. |
| 2012/0308124 | A1* | 12/2012 | Belhumeur ........ G06K 9/00281 382/159 |
| 2013/0151441 | A1 | 6/2013 | Archambeau et al. |
| 2014/0358831 | A1 | 12/2014 | Adams et al. |
| 2016/0292129 | A1 | 10/2016 | Adams et al. |
| 2016/0328655 | A1 | 11/2016 | Adams et al. |

OTHER PUBLICATIONS

Bergstra, J. et al. (Sep. 2012). "Making a science of model search". arXiv preprint arXiv:1209.5111. 11 pages.*

Li et al., Multi-objective uniform design as a SVM model selection tool for face recognition, *Expert Systems with Applications*, 38(6):6689-6695, Jun. 2011.

Zuluaga et al., Active Learning for Multi-Objective Optimization, *Proceedings of the 30th International Conference on Machine Learning*, 28(1), Feb. 15, 2013.

Lagaros et al., Multi-objective design optimization using cascade evolutionary computations, *Comput. Methods Appl. Mech. Engrg.*, 194:3496-3515, 2005.

*International Search Report and Written Opinion*, dated Dec. 9, 2014, from International Application No. PCT/US14/40141.

Clark, Scott, "Parallel Machine Learning Algorithms in Bioinformatics and Global Optimization," Cornell University, 2012.

Marchant et al., Bayesian Optimisation for Intelligent Environmental Monitoring. 2012 IEEE/RSJ International Conference on Intelligent Robots and Systems. Vilamoura, Algarve, Portugal. Oct. 7-12, 2012;2242-9.

Mochus, J. et al., the application of Bayesian methods for seeking the extremum. *Towards Global Optimization*, 2: 117-129, 1978.

Jones, D.R. et al., A taxonomy of global optimization methods based on response surfaces. *Journal of Global Optimization*. 21 (4): 345-383, 2001.

Srinivas, N. et al., Gaussian process optimization in the bandit setting: No regret and experimental design. In *Proceedings of the 27th Int'l Conf. on Machine Learning*, 2010.

Bull, A., Convergence rates of efficient global optimization algorithms. *Journal of Machine Learning Research* (3-4): 2879-2904, 2011.

Bergstra, J. et al., Algorithms for hyper-parameter optimization. In *Advances in Neural Information Processing Systems* 25, 2011.

Kennedy, M. et al., Bayesian calibration of computer models. *Journal of the Royal Statistical Soc.: Series B (Statistical Methodology)*, 63 (3), 2001.

Hutter, F. et al., Sequential model-based optimization for general algorithm configuration. In *Learning and Intelligent Optimization* 5, 2011.

Mahendran, N. et al., Adaptive MCMC with Bayesian optimization. *Appearing in Proceedings of th 13th International Conference on Artificial Intelligence and Statistics (AISTATS) 2010*, Chia Laguna Resort, Sardinia, Italy. vol. 9 of JMLR: W&CP 9, 2010.

Bergstra, J. et al., Random search for hyper-parameter optimization. *Journal of Machine Learning Research*, 13: 281-305, 2012.

Brochu, E. et al., A tutorial on Bayesian optimization of expensive cost functions, with application to active user modeling and hierarchical reinforcement learning. *preprint*, 2010, arXiv: 1012.2599.

Murray, I. et al., Slice sampling covariance hyperparameters of latent Gaussian models. In *Advances in Neural Information Processing Systems* 24, pp. 1723-1731, 2010.

Teh, Y. et al., Semiparametric latent factor models. In *AISTATS*, 2005.

Bonilla, E. et al., Multi-task Gaussian process prediction. In *Advances in Neural Information Processing Systems* 22, 2008.

Ginsbourger, D. et al., Dealing with asynchronicity in parallel Gaussian process based global optimization. http://hal.archives-ouvertes.fr/hal-00507632, 2010.

Hoffman, M. et al., Online learning for latent Dirichlet allocation. In *Advances in Neural Information Processing Systems* 24, 2010.

Miller, K. et al., Max-margin min-entropy models. In *AISTATS*, 2012.

Yu, C.N.J. et al., Learning structural SVMs with latent variables. In *Proceedings of the 26th Int'l Conf. on Machine Learning*, 2009.

Kumar, M. et al., Self-paced learning for latent variable models. In *Advances in Neural Information Processing Systems* 25, 2010.

Saxe, A. et al., On random weights and unsupervised feature learning. In *Proceedings of the 28th Int'l Conf. on Machine Learning*, 2011.

Coates, A. et al., Selecting receptive fields in deep networks. In *Advances in Neural Information Processing Systems* 25, 2011.

Alvarez, M. et al., Computationally efficient convolved multiple output gaussian processes. *Journal of Machine Learning Research*, 12 (5): 1459-1500, 2011.

Hoffman, M. et al., Portfolio allocation for Bayesian optimization. In *Uncertainty in Artificial Intelligence*, 2011.

Borchu, E. et al., A bayesian interactive optimization approach to procedural animation design. In *Eurographics ACM SIGGRAPH Symposium on Computer Animation*, 2010.

Snoek, J. et al., Practival Bayesian optimization of machine learning algorithms. In *Neural Information Processing Systems*, 2012.

Hennig, P. et al., Entropy search for information-efficient global optimization. *Journal of Machine Learning Research*, 13, 2012.

Bardenet, R. et al., Collaborative hyperparameter tuning. In *Proceedings of the 30th Annual Int'l Conference on Machine Learning*, 2013.

Le Cun, B. et al., Handwritten digit recognition with a back-propagation network. In *Advances in Neural Information Processing Systems*, 1990.

Netzer, Y. et al., Reading digits in natural images with unsupervised feature learning. In *NIPS Workshop on Deep Learning and Unsupervised Feature Learning*, vol. 2011, 2011.

Coates, A. et al., An analysis of single-layer networks in unsupervised feature learning. *Artificial Intelligence and Statistics*, 2011.

Hinton, G. et al., Improving neural networks by preventing co-adaptation of feature detectors. *arXiv preprint arXiv:1207.0580*, 2012.

Zeiler, M. et al., Stochastic pooling for regularization of deep convolutional neural networks. *arXiv preprint arXiv*: 1301.3557, 2013.

Goodfellow, I. et al., Maxout networks. In *Proceedings of the 30th Int'l Conference on Machine Learning*, 2013.

Gens, R. et al., Discriminative learning of sum-product networks. In *Advances in Neural Information Processing Systems*, 2012.

Salakhutdinov, R. et al., Probabilistic matrix factorization. *Advances in Neural Information Processing Systems*, 2008.

Herlocker, J. et al., An algorithmic framework for performing collaborative filtering. In *Proceedings of the 22nd Annual Int'l ACM SIGIR Conference on Research and Development in Information Retrieval*, 1999.

Osborne, M. et al., Gaussian Processes for Global Optimization. In *Learning and Intelligent Optimization*, 2009.

Higdon, D. et al., Non-stationary spatial modeling. *Bayesian Statistics*, 6, 1998.

Sampson, P. et al., Nonparametric estimation of nonstationary spatial covariance structure. *Journal of the American Statistical Association*, 87 (417): 108-119, 1992.

(56) References Cited

OTHER PUBLICATIONS

Schmidt, A. et al., Bayesian inference for nonstationary spatial covariance structures via spatial deformations. *Journal of the Royal Statistical Society Series B*, 65: 743-758, 2003.
Bornn, L. et al., Modeling nonstationary processes through dimension expansion. *Journal of the American Statistical Society*, 107 (497), 2012.
Snelson, E. et al., Warped Gaussian processes. In *Advances in Neural Information Processing Systems*, 2003.
*Invitation to Pay Additional Fees and, Where Applicable, Protest Fees*, dated Oct. 2, 2014 from International Application No. PCT/US14/40141.
Desautels et al., "Parallelizing Exploration-Exploitation Tradeoffs with Gaussian Process Bandit Optimization" *Proceedings of the 29th International Conference on Machine Learning, Edinburgh, Scotland, UK, 2012*.
Jones, D. R., et al., "Efficient global optimization of expensive black-box functions," *Journal of Global Optimization*, 13: 455-492, (1998).
Bartz-Beielstein, T. et al., "Sequential parameter optimization." In *Proceedings of Congress on Evolutionary Computation (CEC'05)*, Edinburgh, Scotland, IEEE Press, vol. 1, pp. 773-780 (2005).
Hutter, F., et al., "Sequential model-based optimization for general algorithm configuration," In *Proceedings of the 5th International Conference on Learning and Intelligent Optimization* (LION 5), LNCS 6683, pp. 507-523 (2011).
Thornton, C., et al., "Auto-WEKA: combined selection and hyperparameter optimization of classification algorithms," *Proceedings of KDD*, Chicago, IL (2013).
Bergstra, J., et al., "Algorithms for hyper-parameter optimization," In *Proceedings of Neural Information Processing Systems (NIPS)*, vol. 24, The MIT Press (2011).
Williams, B. J., et al., "Sequential design of computer experiments to minimize integrated response functions," *Statistica Sinica* 10(2000), pp. 1133-1152.
Osborne, M. A., et al., "Gaussian processes for global optimization," *Proceedings of the 3rd Learning and Intelligent Optimization Conference (LION 3)* (2009).
Huang et al., "Sequential kriging optimization using multiple-fidelity evaluations," *Struct. Multidisc. Optim.* (2006) 32: 369-382.
Hutter et al., "An Experimental Investigation of Model-Based Parameter Optimization: SPO and Beyond," *GECCO'09*, Jul. 8-12, 2009, Montréal, Québec, Canada.
Hutter et al., "Time-Bounded Sequential Parameter Optimization," C. Blum and R. Battiti (Eds.):*lion 4, lncs 6073*, pp. 281-298, 2010.
Hutter et al., "An Evaluation of Sequential Model-Based Optimization for Expensive Blackbox Functions," GECCO'13 Companion, Jul. 6-10, 2013, Amsterdam, The Netherlands.
Hutter et al., "Parallel Algorithm Configuration," Y. Hamadi and M. Schoenauer (Eds.): LION 6, LNCS 7219, pp. 55-70, 2012.
Hutter et al., "Bayesian Optimization With Censored Response Data," *2011 NIPS workshop on Bayesian Optimization, Experimental Design, and Bandits*.
Afshar et al., Probabilistic quality control in non-gaussian process control applications. IEEE International Conference on Automation and Logistics 2009. ICAL '09. 2009;498-503.
Bermak et al., Bayesian Learning Using Gaussian Process for Gas Identification. IEEE Trans Instr Meas. Jun. 2006;55(3):787-92.
Insua et al., Feedforward neural networks for nonparametric regression. In "Practical Nonparametric and Semiparametric Bayesian Statistics". 1998;181-93.
Kapoor et al., Multilabel classification using bayesian compressed sensing. Adv Neur Info Proc Sys. Dec. 2012;2645-53. 9 pages.
Karshenas et al., Multi-objective Optimization with Joint Probabilistic Modeling of the Objectives and Variables. Evolutionary Multi-Criterion Optimization (EMO) 2011. Comp Sci. 2011;6576:298-312.
Snoek et al., Input Warping for Bayesian Optimization of Non-Stationary Functions. 31st International Conference on Machine Learning. Feb. 15, 2014;1674-82. 9 pages.
Extended European Search Report for Application No. 14804134.6 dated Aug. 31, 2017.
Krause et al., Contextual Gaussian Process Bandit Optimization. Neural Information Processing Systems. Dec. 12, 2011; 24: 2447-55.
Skolidis et al., Bayesian Multitask Classification with Gaussian Process Priors. IEEE Transactions on Neural Networks. Oct. 10, 2011; 22(12):2011-21.
Snoek et al., Practical Bayesian optimization of machine learning algorithms (w/ supplementary materials). Proceedings of the 26th Annual Conference on Neural Information Processing Systems. Dec. 3, 2012; 2951-2959.
Zhang et al., Expensive Multiobjective Optimization by MOEA/D with Gaussian Process Model. IEEE Transactions on Evolutionary Computation. May 28, 2010; 14(3):456-74.

* cited by examiner

SYSTEMS AND METHODS FOR PARALLELIZING BAYESIAN OPTIMIZATION

CROSS-REFERENCE TO RELATED APPLICATIONS

This application claims the benefit under 35 U.S.C. § 119(e) of U.S. Provisional Patent Application Ser. No. 61/829,090, entitled "TECHNIQUES FOR PERFORMING BAYESIAN OPTIMIZATION," filed on May 30, 2013, U.S. Provisional Patent Application Ser. No. 61/829,604, entitled "TECHNIQUES FOR PERFORMING BAYESIAN OPTIMIZATION," filed on May 31, 2013, and U.S. Provisional Patent Application Ser. No. 61/910,837, entitled "TECHNIQUES FOR PERFORMING BAYESIAN OPTIMIZATION," filed on Dec. 2, 2013, each of which is herein incorporated by reference in its entirety.

FEDERALLY SPONSORED RESEARCH

This invention was made with government support under YFA N66001-12-1-4219 awarded by the Defense Advanced Research Projects Agency (DARPA). The government has certain rights in the invention.

BACKGROUND

A machine learning system may be configured to use one or more machine learning techniques (e.g., classification techniques, clustering techniques, regression techniques, structured prediction techniques, etc.) and/or models (e.g., statistical models, neural networks, support vector machines, decision trees, graphical models, etc.) for processing data. Machine learning systems are used to process data arising in a wide variety of applications across different domains including, but not limited to, text analysis, machine translation, speech processing, audio processing, image processing, visual object recognition, and the analysis of biological data.

SUMMARY

Some embodiments are directed to a method for use in connection with performing optimization using an objective function. The method comprises using at least one computer hardware processor to perform: identifying, using an integrated acquisition utility function and a probabilistic model of the objective function, at least a first point at which to evaluate the objective function; evaluating the objective function at least at the identified first point; and updating the probabilistic model of the objective function using results of the evaluating to obtain an updated probabilistic model of the objective function.

Some embodiments are directed to at least one non-transitory computer-readable storage medium storing processor executable instructions that, when executed by at least one computer hardware processor, cause the at least one computer hardware processor to perform a method for use in connection with performing optimization using an objective function. The method comprises identifying, using an integrated acquisition utility function and a probabilistic model of the objective function, at least a first point at which to evaluate the objective function; evaluating the objective function at least at the identified first point; and updating the probabilistic model of the objective function using results of the evaluating to obtain an updated probabilistic model of the objective function.

Some embodiments are directed to a system for use in connection with performing optimization using an objective function. The system comprising at least one computer hardware processor; and at least one non-transitory computer-readable storage medium storing processor-executable instructions that, when executed by the at least one computer hardware processor, cause the at least one computer hardware processor to perform: identifying, using an integrated acquisition utility function and a probabilistic model of the objective function, at least a first point at which to evaluate the objective function; evaluating the objective function at least at the identified first point; and updating the probabilistic model of the objective function using results of the evaluating to obtain an updated probabilistic model of the objective function.

In some embodiments, including any of the preceding embodiments, the objective function relates values of hyper-parameters of a machine learning system to values providing a measure of performance of the machine learning system. In some embodiments, the objective function relates values of a plurality of hyper-parameters of a neural network for identifying objects in images to respective values providing a measure of performance of the neural network in identifying the objects in the images.

In some embodiments, including any of the preceding embodiments, the processor-executable instructions further cause the at least one computer hardware processor to perform: identifying, using the integrated acquisition utility function and the updated probabilistic model of the objective function, at least a second point at which to evaluate the objective function; and evaluating the objective function at least at the identified second point.

In some embodiments, including any of the preceding embodiments, the probabilistic model has at least one parameter, and the integrated acquisition utility function is obtained at least in part by integrating an initial acquisition utility function with respect to the at least one parameter of the probabilistic model.

In some embodiments, including any of the preceding embodiments, the initial acquisition utility function is an acquisition utility function selected from the group consisting of: a probability of improvement utility function, an expected improvement utility function, a regret minimization utility function, and an entropy-based utility function.

In some embodiments, including any of the preceding embodiments, the probabilistic model of the objective function comprises a Gaussian process or a neural network.

In some embodiments, including any of the preceding embodiments, the identifying is performed at least in part by using a Markov chain Monte Carlo technique.

In some embodiments, including any of the preceding embodiments, the processor-executable instructions further cause the at least one computer hardware processor to perform: identifying a plurality of points at which to evaluate the objective function; evaluating the objective function at each of the plurality of points; and identifying or approximating, based on results of the evaluating, a point at which the objective function attains a maximum value.

Some embodiments are directed to a method for use in connection with performing optimization using an objective function. The method comprises using at least one computer hardware processor to perform: evaluating the objective function at a first point; before evaluating the objective function at the first point is completed: identifying, based on likelihoods of potential outcomes of evaluating the objective function at the first point, a second point different from the first point at which to evaluate the objective function; and evaluating the objective function at the second point.

Some embodiments are directed to a method for use in connection with performing optimization using an objective function. The method comprises: using at least one computer hardware processor to perform: beginning evaluation of the objective function at a first point; before evaluating the objective function at the first point is completed: identifying, based on likelihoods of potential outcomes of evaluating the objective function at the first point, a second point different from the first point at which to evaluate the objective function; and beginning evaluation of the objective function at the second point.

Some embodiments are directed to at least one non-transitory computer-readable storage medium storing processor executable instructions that, when executed by at least one computer hardware processor, cause the at least one computer hardware processor to perform a method for use in connection with performing optimization using an objective function. The method comprises: beginning evaluation of the objective function at a first point; before evaluating the objective function at the first point is completed: identifying, based on likelihoods of potential outcomes of evaluating the objective function at the first point, a second point different from the first point at which to evaluate the objective function; and beginning evaluation the objective function at the second point.

Some embodiments are directed to a system for use in connection with performing optimization using an objective function. The system comprises at least one computer hardware processor; and at least one non-transitory computer-readable storage medium storing processor-executable instructions that, when executed by the at least one computer hardware processor, cause the at least one computer hardware processor to perform: beginning evaluation of the objective function at a first point; before evaluating the objective function at the first point is completed: identifying, based on likelihoods of potential outcomes of evaluating the objective function at the first point, a second point different from the first point at which to evaluate the objective function; and beginning evaluation of the objective function at the second point.

In some embodiments, including any of the preceding embodiments, the objective function relates values of hyper-parameters of a machine learning system to values providing a measure of performance of the machine learning system.

In some embodiments, including any of the preceding embodiments, the objective function relates values of a plurality of hyper-parameters of a neural network for identifying objects in images to respective values providing a measure of performance of the neural network in identifying the objects in the images.

In some embodiments, including any of the preceding embodiments, the at least one computer hardware processor comprises a first computer hardware processor and a second computer hardware processor different from the first computer hardware processor, and the processor-executable instructions cause: at least the first computer hardware processor to perform evaluation of the objective function at the first point; and at least the second computer hardware processor to perform evaluation of the objective function at the second point.

In some embodiments, including any of the preceding embodiments, the identifying comprises using an acquisition utility function obtained at least in part by calculating an expected value of an initial acquisition utility function with respect to potential values of the objective function at the first point.

In some embodiments, including any of the preceding embodiments, the likelihoods are obtained using a probabilistic model of the objective function, and the processor-executable instructions further cause the at least one computer hardware processor to perform: updating the probabilistic model of the objective function using results of evaluating the objective function at the first point and/or the second point to obtain an updated probabilistic model of the objective function.

In some embodiments, including any of the preceding embodiments, the processor-executable instructions further cause the at least one computer hardware processor to perform: identifying, using the updated probabilistic model of the objective function, at least a third point at which to evaluate the objective function; and beginning evaluation of the objective function at least at the identified third point.

In some embodiments, including any of the preceding embodiments, the probabilistic model of the objective function comprises a Gaussian process or a neural network.

Some embodiments are directed to a method for use in connection with performing optimization using an objective function that maps elements in a first domain to values in a range. The method comprises using at least one computer hardware processor to perform: identifying a first point at which to evaluate the objective function at least in part by using an acquisition utility function and a probabilistic model of the objective function, wherein the probabilistic model depends on a non-linear one-to-one mapping of elements in the first domain to elements in a second domain; evaluating the objective function at the identified first point to obtain a corresponding first value of the objective function; and updating the probabilistic model of the objective function using the first value to obtain an updated probabilistic model of the objective function.

Some embodiments are directed to at least one non-transitory computer-readable storage medium storing processor-executable instructions that, when executed by the at least one computer hardware processor, cause the at least one computer hardware processor to perform a method for use in connection with performing optimization using an objective function that maps elements in a first domain to values in a range. The method comprises: identifying a first point at which to evaluate the objective function at least in part by using an acquisition utility function and a probabilistic model of the objective function, wherein the probabilistic model depends on a non-linear one-to-one mapping of elements in the first domain to elements in a second domain; and evaluating the objective function at the identified first point to obtain a corresponding first value of the objective function.

Some embodiments are directed to a system for use in connection with performing optimization using an objective function that maps elements in a first domain to values in a range. The system comprises at least one computer hardware processor; and at least one non-transitory computer-readable storage medium storing processor-executable instructions that, when executed by the at least one computer hardware processor, cause the at least one computer hardware processor to perform: identifying a first point at which to evaluate the objective function at least in part by using an acquisition utility function and a probabilistic model of the objective function, wherein the probabilistic model depends on a non-linear one-to-one mapping of elements in the first domain to elements in a second domain; evaluating the objective function at the identified first point to obtain a corresponding first value of the objective function; and updating the probabilistic model of the objective function using the first value to obtain an updated probabilistic model of the objective function.

In some embodiments, including any of the preceding embodiments, the objective function relates values of hyper-parameters of a machine learning system to values providing a measure of performance of the machine learning system.

In some embodiments, including any of the preceding embodiments, the objective function relates values of a plurality of hyper-parameters of a neural network for identifying objects in images to respective values providing a measure of performance of the neural network in identifying the objects in the images.

In some embodiments, including any of the preceding embodiments, the processor-executable instructions further cause the at least one computer hardware processor to perform: identifying a second point at which to evaluate the objective function; evaluating the objective function at the identified second point to obtain a corresponding second value of the objective function; and updating the updated probabilistic model of the objective function using the second value to obtain a second updated probabilistic model of the objective function.

In some embodiments, including any of the preceding embodiments, the non-linear one-to-one mapping is bijective.

In some embodiments, including any of the preceding embodiments, the non-linear one-to-one mapping comprises a cumulative distribution function of a Beta distribution.

In some embodiments, including any of the preceding embodiments, the acquisition utility function is an integrated acquisition utility function.

In some embodiments, including any of the preceding embodiments, the probabilistic model of the objective function is obtained at least in part by using a Gaussian process or a neural network.

Some embodiments are directed to a method for use in connection with performing optimization using a plurality of objective functions associated with a respective plurality of tasks. The method comprises using at least one computer hardware processor to perform: identifying, based at least in part on a joint probabilistic model of the plurality of objective functions, a first point at which to evaluate an objective function in the plurality of objective functions; selecting, based at least in part on the joint probabilistic model, a first objective function in the plurality of objective functions to evaluate at the identified first point; evaluating the first objective function at the identified first point; and updating the joint probabilistic model based on results of the evaluation to obtain an updated joint probabilistic model.

Some embodiments are directed to at least one non-transitory computer-readable storage medium storing processor-executable instructions that, when executed by the at least one computer hardware processor, cause the at least one computer hardware processor to perform a method for use in connection with performing optimization using a plurality of objective functions associated with a respective plurality of tasks. The method comprises: identifying, based at least in part on a joint probabilistic model of the plurality of objective functions, a first point at which to evaluate an objective function in the plurality of objective functions; selecting, based at least in part on the joint probabilistic model, a first objective function in the plurality of objective functions to evaluate at the identified first point; evaluating the first objective function at the identified first point; and updating the joint probabilistic model based on results of the evaluation to obtain an updated joint probabilistic model.

Some embodiments are directed to a system for use in connection with performing optimization using a plurality of objective functions associated with a respective plurality of tasks. The system comprises at least one computer hardware processor; and at least one non-transitory computer-readable storage medium storing processor-executable instructions that, when executed by the at least one computer hardware processor, cause the at least one computer hardware processor to perform: identifying, based at least in part on a joint probabilistic model of the plurality of objective functions, a first point at which to evaluate an objective function in the plurality of objective functions; selecting, based at least in part on the joint probabilistic model, a first objective function in the plurality of objective functions to evaluate at the identified first point; evaluating the first objective function at the identified first point; and updating the joint probabilistic model based on results of the evaluation to obtain an updated joint probabilistic model.

In some embodiments, including any of the preceding embodiments, the first objective function relates values of hyper-parameters of a machine learning system to values providing a measure of performance of the machine learning system.

In some embodiments, including any of the preceding embodiments, the first objective function relates values of a plurality of hyper-parameters of a neural network for identifying objects in images to respective values providing a measure of performance of the neural network in identifying the objects in the images.

In some embodiments, including any of the preceding embodiments, the processor-executable instructions further cause the at least one computer hardware processor to perform: identifying, based at least in part on the updated joint probabilistic model of the plurality of objective functions and, a second point at which to evaluate an objective function in the plurality of objective functions; selecting, based at least in part on the joint probabilistic model, a second objective function in the plurality of objective functions to evaluate at the identified first point; and evaluating the second objective function at the identified first point.

In some embodiments, including any of the preceding embodiments, the first objective function is different from the second objective function.

In some embodiments, including any of the preceding embodiments, the joint probabilistic model of the plurality of objective functions, models correlation among tasks in the plurality of tasks.

In some embodiments, including any of the preceding embodiments, the joint probabilistic model of the plurality of objective functions comprises a vector-valued Gaussian process.

In some embodiments, including any of the preceding embodiments, the joint probabilistic model comprises a covariance kernel obtained based, at least in part, on a first covariance kernel modeling correlation among tasks in the plurality of tasks and a second covariance kernel modeling correlation among points at which objective functions in the plurality of objective functions may be evaluated.

In some embodiments, including any of the preceding embodiments, the identifying is performed further based on a cost-weighted entropy-search utility function.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Conventional techniques for configuring a machine learning system involve setting one or more parameters of the system manually and setting one or more other parameters of the system automatically (e.g., by learning values of the parameters using training data). For example, a machine learning system may have one or more parameters, sometimes called "hyper-parameters," whose values are set manually before the machine learning system is trained (e.g., before the values of one or more other parameters of the machine learning system are learned using training data). The hyper-parameters may be used during training of the machine learning system (e.g., the learning technique for learning parameters of the machine learning system may depend on values of the hyper-parameters) and during run-time (e.g., the way in which a trained machine learning system processes new data may depend on values of the hyper-parameters).

Figure 1:
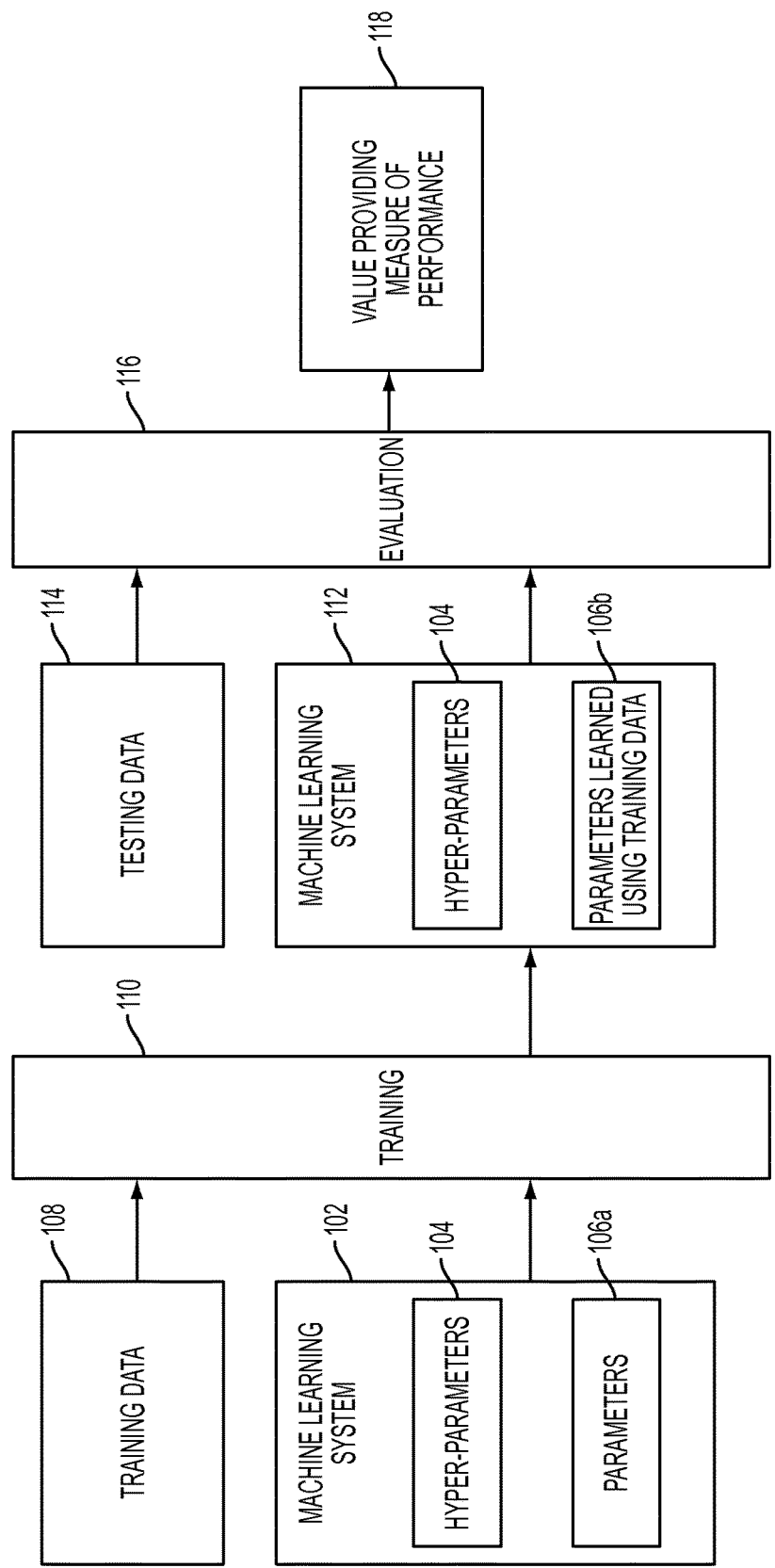
FIG. 1 is a block diagram illustrating configuration of a machine learning system.

For example, as illustrated in FIG. 1, machine learning system 102 may be configured by first manually setting hyper-parameters 104, and subsequently learning, during training stage 110, the values of parameters 106a, based on training data 108 and hyper-parameters 104, to obtain learned parameter values 106b. The performance of the configured machine learning system 112 may then be evaluated during the evaluation stage 116, by using testing data 114 to calculate one or more values providing a measure of performance 118 of the configured machine learning system 112. Measure of performance 118 may be a measure of generalization performance and/or any other suitable measure of performance.

As one non-limiting example, machine learning system 102 may be a machine learning system for object recognition comprising a multi-layer neural network associated with one or more hyper-parameters (e.g., one or more learning rates, one or more dropout rates, one or more weight norms, one or more hidden layer sizes, convolutional kernel size when the neural network is a convolutional neural network, pooling size, etc.). The hyper-parameters are conventionally set manually prior to training the neural network on training data. As another non-limiting example, machine learning system 102 may be a machine learning system for text processing that uses a latent Dirichlet allocation technique to process text in chunks, which technique involves using a directed graphical model associated with various hyper-parameters (e.g., one or more learning rates, size of text chunks to process at each iteration of training the graphical model, etc.). These hyper-parameters are conventionally set manually prior to training the directed graphical model on training data. As yet another non-limiting example, machine learning system 102 may be a machine learning system for the analysis of protein DNA sequences comprising a support vector machine (e.g. a latent structured support vector machine) associated with one or more hyper-parameters (e.g., one or more regularization parameters, one or more entropy terms, model convergence tolerance, etc.). These hyper-parameters are conventionally set manually prior to training the support vector machine on training data. It should be appreciated that these examples are illustrative, and that there are many other examples of machine learning systems having hyper-parameters that are conventionally set manually.

The performance of machine learning systems (e.g., the generalization performance) is sensitive to hyper-parameters and manually setting the hyper-parameters of a machine learning system to "reasonable" values (i.e., manually tuning the machine learning system), as is conventionally done, may lead to poor or sub-optimal performance of the system. Indeed, the difference between poor settings and good settings of hyper-parameters may be the difference between a useless machine learning system and one that has state-of-the-art performance.

One conventional approach to setting hyper-parameters of a machine learning system is to try different settings of hyper-parameters and evaluate performance of the machine learning system for each such setting. However, such a brute-force search approach is not practical because a machine learning system may have a large number of hyper-parameters so that there are too many different settings that would have to be evaluated. Moreover, evaluating the performance of the machine learning system for each setting of hyper-parameters may take a long time and/or consume a large amount of computational resources because the machine learning system would need to be retrained for each setting of hyper-parameters, which is very computationally demanding as many machine learning systems are trained using very large sets of training data (e.g., training a machine learning system may take days). As a result, while there may be time and/or computational resources to evaluate a small number of hyper-parameter settings, exhaustively trying numerous permutations of possible hyper-parameter settings may not be feasible.

Another conventional approach to setting hyper-parameters of a machine learning system is to use Bayesian optimization techniques. This approach involves treating the problem of setting hyper-parameters of a machine learning system as an optimization problem whose goal is to find a set of hyper-parameter values for a machine learning system that correspond to the best performance of the machine learning system and applying an optimization technique to solve this optimization problem. To this end, the relationship between the hyper-parameter values of a machine learning system and its performance may be considered an objective function for the optimization problem (i.e., the objective function maps hyper-parameter values of a machine learning system to respective values providing a measure of performance of the machine learning system), and solving the optimization problem involves finding one or more extremal points (e.g., local minima, local maxima, global minima, global maxima, etc.) in the domain of the objective function. However, this objective function is not known in closed form (e.g., analytically) for any practical machine learning system whose performance depends not only on the values of its hyper-parameters, but also on the training data used to train the machine learning system and other factors (e.g., as shown in FIG. 1, the measure of performance 118 depends not only on hyper-parameters 104, but also on training data 108, testing data 114, details of the training procedure 110, etc.). Moreover, although the objective function may be evaluated point-wise (e.g., for each setting of hyper-parameter values of a machine learning system, a value of providing a measure of performance of the machine learning system may be obtained), each such evaluation may require a significant amount of time and/or power to perform.

Accordingly, optimization techniques that require a closed-form analytic representation of the objective function (e.g., techniques that require calculation of gradients) and/or a large number of objective function evaluations (e.g., interior point methods) are generally not viable approaches to identifying hyper-parameter values of machine learning systems. On the other hand, Bayesian optimization techniques require neither exact knowledge of the objective function nor a large number of objective function evaluations. Although Bayesian optimization techniques rely on evaluations of the objective function, they are designed to reduce the number of such evaluations.

Bayesian optimization involves constructing a probabilistic model of the objective function based on previously-obtained evaluations of the objective function, updating the probabilistic model based on new evaluations of the objective function that become available, and using the probabilistic model to identify extremal points of the objective function (e.g., one or more local minima, local maxima, global minima, global maxima, etc.). The probabilistic model, together with a so-called acquisition utility function (examples of which are described in more detail below), is used to make informed decisions about where to evaluate the objective function next, and the new evaluations may be used to update the probabilistic model of the objective function. In this way, the number of objective function evaluations performed to obtain a probabilistic model that accurately represents the objective function with high confidence may be reduced. The greater the fidelity of the probabilistic model to the underlying objective function, the more likely that one or more extremal points identified by using the probabilistic model correspond to (e.g., are good estimates/approximations of) extremal points of the objective function.

Accordingly, the conventional Bayesian optimization approach to setting hyper-parameters of a machine learning system involves constructing a probabilistic model for the relationship between the hyper-parameter values of a machine learning system and its performance and using this probabilistic model together with an acquisition utility function to make informed decisions about which hyper-parameter values to try. In this way, the number of times performance of a machine learning system is evaluated for sets of hyper-parameter values may be reduced.

The inventors have recognized that conventional Bayesian optimization techniques, including conventional Bayesian optimization techniques for setting hyper-parameters of machine learning systems, may be improved. The inventors have recognized that one shortcoming of conventional Bayesian optimization techniques is their performance is overly sensitive to the values of the parameters of the probabilistic model of the objective function (e.g., a small change in the parameter values of the probabilistic model may lead to a large change in the overall performance of the Bayesian optimization technique). In particular, the inventors have appreciated that the acquisition utility function used in Bayesian optimization to identify points at which to evaluate the objective function next (e.g., to identify the next set of hyper-parameter values for which to evaluate performance of a machine learning system), is sensitive to the values of the parameters of the probabilistic model of the objective function, which may lead to poor overall performance of the Bayesian optimization technique.

Accordingly, some embodiments are directed to performing Bayesian optimization using an integrated acquisition utility function obtained by averaging multiple acquisition functions, each of which corresponds to different parameter values of the probabilistic model (such averaging is sometimes termed "integrating out" with respect to the parameters of the probabilistic model). The integrated acquisition utility function may be less sensitive to the parameters of the probabilistic model of the objective function, which may improve the robustness and performance of conventional Bayesian optimization techniques.

The inventors have recognized that another shortcoming of conventional Bayesian optimization techniques, including conventional Bayesian optimization techniques for setting hyper-parameters of machine learning systems, is that conventional Bayesian optimization techniques are sequential techniques because they require choosing the next point at which to evaluate the objective function (e.g., identify the next set of hyper-parameter values for which to evaluate performance of a machine learning system) based on results of all previous evaluations of the objective function. Therefore, each evaluation of the objective function must be completed before the next point at which to evaluate the objective function is identified. As such, all the evaluations of the objective function are performed sequentially (i.e., one at a time).

Accordingly, some embodiments are directed to parallelizing Bayesian optimization so that multiple evaluations of the objective function may be performed in parallel (e.g., so that multiple different hyper-parameter values for a machine learning system may be concurrently evaluated, for example, using different computer hardware processors). In these embodiments, the next point at which to evaluate the objective function may be selected prior to completion of one or more previously-initiated evaluations of the objective function, but the selection may be done based on respective likelihoods of potential outcomes of pending evaluations of the objective function so that some information about the pending evaluations (e.g., the particular points at which the evaluation is being performed) is taken into account when selecting the next point at which to evaluate the objective function. Parallelizing evaluations of the objective function may be useful when evaluation of the objective function is computationally expensive, for example, as the case may be when identifying hyper-parameter values for machine learning systems that take a long time (e.g., days) to train.

The inventors have recognized that another shortcoming of conventional Bayesian optimization techniques, including conventional Bayesian optimization techniques for setting hyper-parameters of machine learning systems, is that conventional Bayesian optimization techniques use a stationary Gaussian process to model the objective function (e.g., using a stationary Gaussian process to model the relationship between the hyper-parameter values of a machine learning system and its performance), which may not be a suitable probabilistic model for objective functions that are non-stationary. For example, a stationary Gaussian process may not be a suitable model for a non-stationary objective function because the second order-statistics of a stationary Gaussian process are translation invariant (e.g., the covariance kernel of the Gaussian process is translation invariant), whereas second-order statistics of the non-stationary objective function may not be translation invariant.

Accordingly, some embodiments are directed to performing Bayesian optimization by using a probabilistic model adapted to more faithfully model stationary and non-stationary objective functions. In some embodiments, the probabilistic model of the objective function may be specified based at least in part on a non-linear one-to-one mapping of elements in the domain of the objective function. In embodiments where the probabilistic model comprises a Gaussian process, the covariance kernel of the Gaussian process may be specified at least in part by using the non-linear one-to-one mapping.

The inventors have recognized that another shortcoming of Bayesian optimization techniques is that, when applied to solving a particular optimization task, they cannot take advantage of information obtained during past applications of these same techniques to a related optimization task. For example, a machine learning system (e.g., a neural network for identifying objects in a set of images) may be applied to different data sets (e.g., different sets of images), but conventional Bayesian optimization techniques require identifying the hyper-parameters of the machine learning system anew for each data set (e.g., for each set of images). None of the information previously obtained while identifying hyper-parameters for a machine learning system using one dataset (e.g., which hyper-parameter values cause the machine learning system to perform well and which hyper-parameter values cause the machine learning system to perform poorly) can be used for identifying hyper-parameter values for the same machine learning system using another dataset.

Accordingly, some embodiments are directed to Bayesian optimization techniques that, when applied to solving a particular optimization task can take advantage of information obtained while solving one or more other related optimization tasks. For example, in some embodiments, information obtained while setting hyper-parameters for a machine learning system using a first data set may be applied to setting hyper-parameters of the machine learning system using a second dataset different from the first dataset. In this way, previously-obtained information may be used to set hyper-parameters for the machine learning system more efficiently (e.g., by using fewer objective function evaluations which may be computationally expensive to perform). More generally, optimization for multiple different optimization tasks may be performed more efficiently because information obtained solving one of the optimization tasks may be used toward solving another optimization task.

Some embodiments of the technology described herein address some of the above-discussed drawbacks of conventional Bayesian optimization techniques, including Bayesian optimization techniques for setting hyper-parameters of machine learning systems. However, not every embodiment addresses every one of these drawbacks, and some embodiments may not address any of them. As such, it should be appreciated that aspects of the technology described herein are not limited to addressing all or any of the above-discussed drawbacks of conventional Bayesian optimization techniques.

It should also be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

In some embodiments, Bayesian optimization techniques involve building a probabilistic model of an objective function based on one or more previously-obtained evaluations of the objective function, and updating the probabilistic model based on any new evaluations of the objective function that become available. Accordingly, in some embodiments, optimization using an objective function may be performed iteratively (for one or multiple iterations) by performing, at each iteration, acts of: identifying a point at which to evaluate the objective function using an acquisition utility function and a probabilistic model of the objective function, evaluating the objective function at the identified point, and updating the probabilistic model based on results of the evaluation. Bayesian optimization techniques described herein may be applied to any of numerous types of objective functions arising in different applications.

As described above, one non-limiting example of an objective function to which Bayesian optimization techniques described herein may be applied is an objective function relating values of one or more hyper-parameters of a machine learning system to respective values providing a measure of performance of the machine learning system configured with these hyper-parameter values (e.g., a machine learning system trained at least in part by using these parameters and/or that processes new data at least in part by using these parameters). One non-limiting example of such a machine learning system is a machine learning system for recognizing objects in images that uses a neural network (e.g., a multi-layer neural network, a convolutional neural network, a feed-forward neural network, a recurrent neural network, a radial basis function neural network, etc.) and/or any other suitable machine learning technique for recognizing objects in images. Examples of hyper-parameters of such a machine learning system have been provided above. Another non-limiting example of such a machine learning system is a machine learning system for processing natural language text (e.g., identifying one or more topics in the text, text mining, etc.) that uses latent Dirichlet allocation (LDA), probabilistic latent semantic analysis, hierarchical LDA, non-parametric LDA and/or any other suitable machine learning technique for processing natural language text. Such machine learning systems may be adapted to processing large sets (e.g., one or more corpora) of natural language text. Examples of hyper-parameters of such a machine learning system have been provided above. Another non-limiting example of such a machine learning system is a machine learning system for analysis of biological data (e.g., a machine learning system for protein motif prediction) using a support vector machine (e.g., a linear support vector machine, a latent structured support vector machine, any suitable maximum margin classifier, etc.) and/or any other suitable machine learning technique for processing biological data. Other non-limiting examples of machine learning systems to which Bayesian optimization techniques described herein may be applied (to set the hyper-parameters of the machine system) include, but are not limited to, machine learning systems for medical image processing (e.g., machine learning systems for identifying anomalous objects in medical images, such as objects attributable to and/or that may indicate the presence of disease), machine learning systems for processing of ultrasound data, machine learning systems for modeling data of any suitable type using non-linear adaptive basis function regression, machine learning systems for processing radar data, machine learning systems for speech processing (e.g., speech recognition, speaker identification, speaker diarization, natural language understanding etc.), and machine learning systems for machine translation.

It should be appreciated that Bayesian optimization techniques described herein are not limited to being applied to setting hyper-parameter values of machine learning systems and, in some embodiments, may be applied to other problems. As one non-limiting example, Bayesian optimization techniques described herein may be applied to an objective function relating parameters of an image and/or video compression algorithm (e.g., one or more parameters specified by one or more of the JPEG compression standards, one or more parameters specified by one or more of the MPEG standards, etc.) to a measure of performance of the image and/or video compression algorithm. As another non-limiting example, Bayesian optimization techniques described herein may be applied to an objective function relating parameters of a computer vision system (e.g., a computer vision system for object recognition, pose estimation, tracking of people and/or objects, optical flow, scene reconstruction etc.). As another non-limiting example, Bayesian optimization techniques described herein may be applied to an objective function relating parameters of a non-linear control system (e.g., a control system for controlling one or more robots) to performance of the control system. As another non-limiting example, Bayesian optimization techniques described herein may be applied to an objective function relating parameters at least partially characterizing a structure being designed (parameters at least partially characterizing an airplane wing) to performance of the structure (e.g., whether the airplane wing has appropriate desired lift characteristics). The above examples are not exhaustive and, more generally, the Bayesian optimization techniques described herein may be applied to any objective function that may be computationally expensive to evaluate and/or any other objective function arising in any suitable optimization problem, as the Bayesian optimization techniques described herein are not limited by the type of objective function to which they may be applied.

As described above, in some embodiments, Bayesian optimization techniques described herein involve generating a probabilistic model of an objective function for a particular task (e.g., an objective function relating hyper-parameters of a machine learning system to its performance). Any suitable type of probabilistic model of the objective function may be used. In some embodiments, the probabilistic model may comprise a Gaussian process, which is a stochastic process that specifies a distribution over functions. A Gaussian process may be specified by a mean function $m:X \rightarrow \mathbb{R}$ and a covariance function (sometimes termed "kernel" function).

For example, when the objective function relates hyper-parameters of a machine learning system to its performance, the Gaussian process is defined on the space of hyper-parameters such that the mean function maps sets of hyper-parameter values (each set of hyper-parameter values corresponding to values of one or more hyper-parameters of the machine learning system) to real numbers and the covariance function represents correlation among sets of hyper-parameter values.

The covariance function may be specified at least in part by a kernel and any of numerous types of kernels may be used. In some embodiments, a Matérn kernel may be used. As one non-limiting example, a 5/2 Matérn kernel ($K_{M52}$) may be used, which kernel may be defined according to:

$$K_{M52}(x,x') = \theta_0\left(1 + \sqrt{5r^2(x,x')} + \frac{5}{3}r^2(x,x')\right)\exp\left\{-\sqrt{5r^2(x,x')}\right\} \quad (1)$$

where $\theta_0$ and r are parameters of the kernel, and where x and x' are points in the domain on which the Gaussian process is defined (e.g., x and x' may represent sets of hyper-parameter values of a machine learning system). The 5/2 Matérn kernel may be preferable to other kernel choices because the induced Gaussian process has favorable properties (e.g., the sample paths of the Gaussian process may be twice-differentiable). However, a Gaussian process specified by using other kernels may be used. Examples of kernels that may be used include, but are not limited to, an automatic relevance determination squared exponential kernel, a rational quadratic kernel, a periodic kernel, a locally periodic kernel, a linear kernel, and a kernel obtained by combining (e.g., multiplying, adding, etc.) of any of the above mentioned kernels.

A probabilistic model of an objective function comprising a Gaussian process may be used to calculate an estimate of the objective function by computing the predictive mean of the Gaussian process given all previously-obtained evaluations of the objective function. The uncertainty associated with this estimate may be calculated by computing the predictive covariance of the Gaussian process given all previously-obtained evaluations of the objective function. For example, the predictive mean and covariance for a Gaussian process on functions $f:X \rightarrow \mathbb{R}$, given N previously-obtained evaluations $\{y_n, 1 \leq n \leq N\}$ of an objective function on the set of points $X=\{x_n \in X\}_{n=1}^N$, may be expressed as:

$$\mu(x;\{x_n,y_n\},\theta)=K(X,x)^T K(X,X)^{-1}(y-m(X)) \quad (2)$$

$$\Sigma(x,x';\{x_n,y_n\},\theta)=K(x,x')-K(X,x)^T K(X,X)^{-1} K(X,x') \quad (3)$$

where $K:X \times X \rightarrow \mathbb{R}$ is the kernel of the Gaussian process, K(X,x) is the N-dimensional column vector of cross-covariances between x and the set X, K(X,X) is the Gram matrix for the set X, y is the N by 1 vector of evaluations, m(X) is the vector of means of the Gaussian process at points in the set X, and $\theta$ is the set of one or more other parameters of the Gaussian process (e.g., parameters of the kernel).

It should be appreciated that the probabilistic model for an objective function is not limited to comprising a Gaussian process model. As one non-limiting example, the probabilistic model for an objective function may comprise a neural network whose weights are random variables such that the neural network specifies a distribution on a set of functions. The neural network may be a convolutional neural network, a deep neural network, and/or any other suitable type of neural network. As another non-limiting example, the probabilistic model for an objective function may comprise an adaptive basis function regression model.

As one non-limiting example, in some embodiments, the probabilistic model may comprise a Bayesian linear regression model specified as a linear combination of N non-linear basis functions $\{\phi(x)\}$, where N is an integer greater than or equal to one. The non-linear basis functions $\{\phi(x)\}$ may be obtained at least in part by using a multi-layer neural network. For example, in some embodiments, the non-linear basis functions may be obtained by training a multi-layer neural network (e.g., using any suitable training techniques) and using a projection from the inputs to the last hidden layer in the multi-layer neural network as the non-linear function basis. These projection may then be used as a feature representation for the Bayesian linear regression model. This may be expressed as follows.

Let $\Phi$ denote a D×N matrix resulting from concatenating the basis functions $\{\phi(x_n); 1 \leq n \leq N\}$ obtained by projecting N inputs $\{x_n; 1 \leq n \leq N\}$ to the final layer of a multi-layer neural network. Then the Bayesian linear regression model for observations y given the inputs $\{x_n\}$ may be expressed as: $p(y|X,\theta,v) = \mathcal{N}(y|m^T\Phi(x), \Sigma_\theta + vI)$ where $y = [y_1, y_2, \ldots, y_N]^T$, $X = \{x_n\}_{n=1}^N$, $m = \theta_0(\Sigma_\theta + vI)^{-1}\Phi^T y$, and $\Sigma_\theta = \theta_0 \Phi^T \Phi$ is the covariance matrix induced by the N input points under the scaling hyper-parameter $\theta_0$. The predictive distribution for the output $\hat{y}$ corresponding to an input $\hat{x}$ may be expressed as $p(\hat{y}|\hat{x},X,\theta,v) = \mathcal{N}(\hat{y}|m^T\phi(\hat{x}), \sigma_2(\hat{x}))$, where $\sigma^2(x)$ is given by $$\frac{1}{\theta_0} + \phi(\hat{x}) \left( \sum\nolimits_\theta + vI \right)^{-1} \phi(\hat{x}).$$

Regardless of the type of probabilistic model used for modeling the objective function, the probabilistic model may be used to obtain an estimate of the objective function and a measure of uncertainty associated with the estimate. For example, when the objective function relates values of hyper-parameters of a machine learning system to its performance, the estimate of the objective function obtained based on the probabilistic model may provide an estimate of the performance of the machine learning system for each set of hyper-parameter values and the measure of uncertainty associated with the estimate may provide a measure of uncertainty (e.g., a variance, a confidence, etc.) associated with the estimate of how well the machine learning system performs for a particular set of hyper-parameter values. Different amounts of uncertainty may be associated with estimates of machine learning system performance corresponding to different hyper-parameter values. For some hyper-parameter values the probabilistic model may be able to provide a high-confidence estimate (e.g., an estimate associated with a low variance) of the machine learning system's performance when configured with those hyper-parameter values, whereas for other hyper-parameter values the probabilistic model may provide a low-confidence estimate (e.g., an estimate associated with a high variance) of the machine learning system's performance when configured with those hyper-parameter values.

The probabilistic model of an objective function may be used to obtain an estimate of the objective function in any of numerous ways. As one-non limiting example, the probabilistic model may be used to calculate an estimate of the objective function by calculating the predictive mean estimate of the objective function under the probabilistic model given all previous observations (i.e., evaluations) of the objective function, and to calculate the associated measure of uncertainty as the predictive covariance. Such calculations may be performed for any of numerous types of probabilistic models including Gaussian processes (e.g., according to the equations provided above), adaptive basis function regression models (of which neural network models are an example), and any other suitable models.

As may be appreciated from the above examples, in some embodiments, the probabilistic model for an objective function may specify a probability distribution on a set of functions (e.g., a set of functions believed to include the objective function or another function that closely approximate the objective function). This probability distribution may specify a probability value to each of one or more functions in the set of functions, the probability value for a particular function indicating the probability that the function is the objective function. For example, a Gaussian process may be considered to induce a distribution on the set of functions on the space on which the Gaussian process is defined. For instance, a Gaussian process may be used to specify a distribution on the set of all possible objective functions (e.g., the set of all objective functions relating hyper-parameter values of a machine learning system to corresponding performance of the machine learning system).

In some embodiments, a probabilistic model of an objective function may be updated based on new information obtained about the objective function. The updated distribution may be more concentrated than the initial distribution and, as such, may provide a lower uncertainty representation of the objective function. The updated distribution may be used to compute various estimates of the objective function. As discussed above, an objective function may not be known in closed form and information about the objective function may be obtained via point-wise evaluation of the objective function. For example, information about an objective function relating hyper-parameters of a machine learning system to its performance may be obtained by evaluating the performance of the machine learning system for each of one or more settings of the hyper-parameters. Accordingly, in some embodiments, a probabilistic model of an objective function may be updated based one or more evaluations of the objective function to reflect the additional information learned about the objective function through the new evaluation(s). For example, in embodiments where the probabilistic model of an objective function comprises a Gaussian process, the Gaussian process may be updated (e.g., its mean and/or covariance function may be updated) based on the new evaluation(s) of the objective function. As another example, in embodiments where the probabilistic model of an objective function comprises a neural network, the neural network may be updated (e.g., probability distributions associated with the weights of a neural network may be updated) based on the new evaluation(s) of the objective function.

Figure 2A:
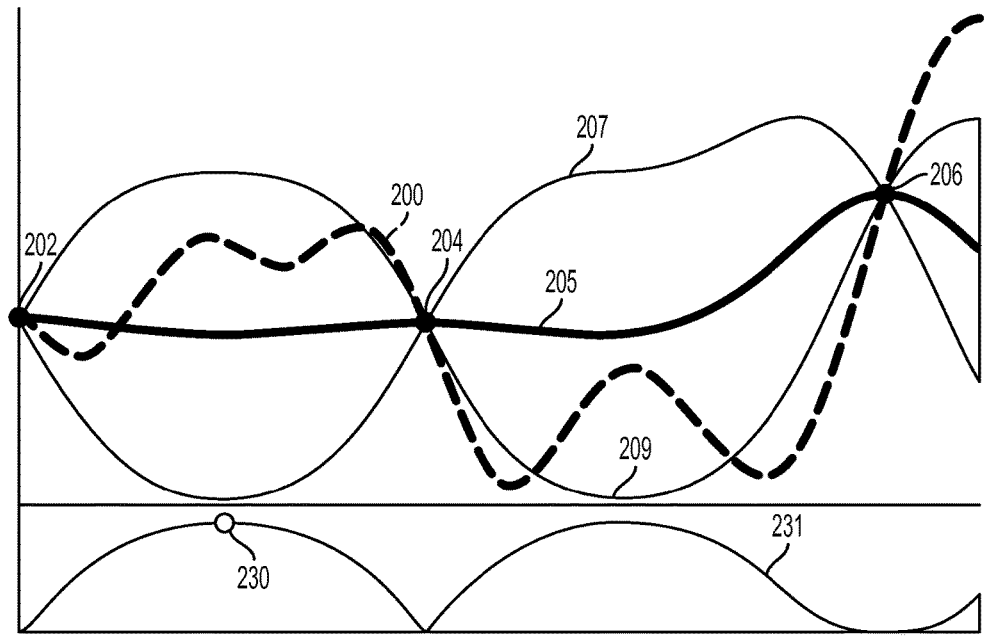
FIGS. 2A-2D illustrate iteratively updating a probabilistic model of an objective function at least in part by using an acquisition utility function, in accordance with some embodiments of the technology described herein.

An illustrative non-limiting example of updating a probabilistic model of an objective function based on one or more evaluations of the objective function is illustrated in FIGS. 2A-2D. FIG. 2A illustrates a probabilistic model of objective function 200 generated based on three previously-obtained evaluations of the objective function at three points to obtain respective values of the objective function 202, 204, and 206. In the illustrative example, the probabilistic model comprises a Gaussian process which was used to calculate an estimate 205 of the objective function by calculating the predictive mean of the Gaussian distribution conditioned on the previous three evaluations of the objective function and a measure of uncertainty associated with the estimate 205 by calculating the predictive covariance (variance in this 1-dimensional example) conditioned on previous three evaluations of the objective function. The measure of uncertainty is illustrated in FIG. 2A by the shaded region shown between curves 207 and 209. It may be seen from FIG. 2A that the probabilistic model is more uncertain about the objective function in regions where the objective function has not been evaluated and less uncertainty around regions where the objective function has been evaluated (e.g., the region of uncertainty shrinks closer to evaluations 202, 204, and 206). That is, the uncertainty associated with the estimate of the objective function is larger in regions where the objective function has not been evaluated (e.g., the predictive variance of the Gaussian process is larger in regions where the objective function has not been evaluated; the predictive variance is 0 at the points where the objective function has been evaluated since the value of the objective function at those points is known exactly).

Figure 2B:
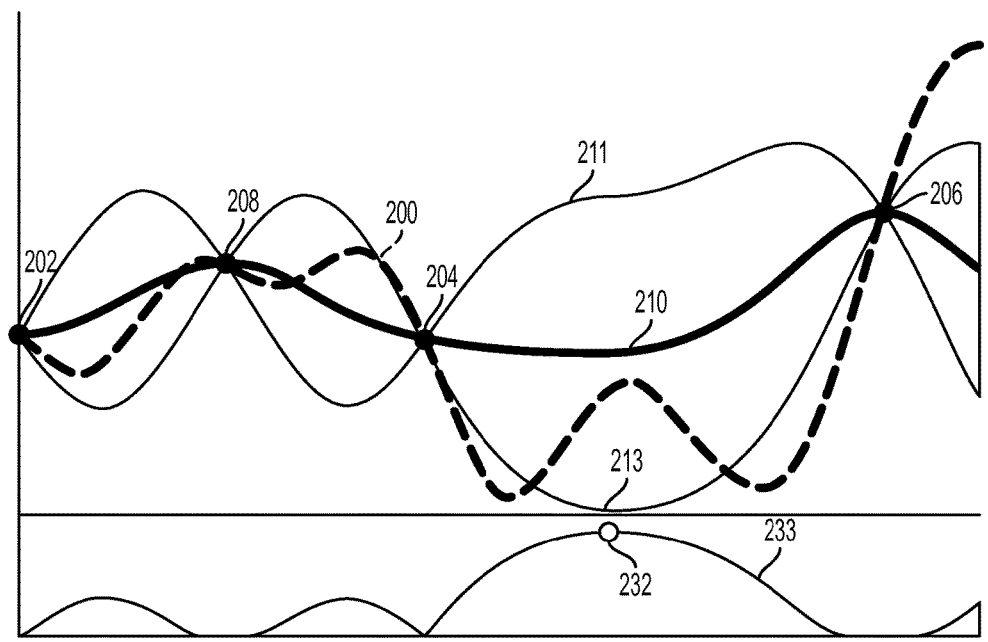

FIG. 2B illustrates the probabilistic model of the objective function 200, after the probabilistic model has been updated based on an additional evaluation of the objective function 200 at a new point to obtain respective objective function value 208. The updated probabilistic model may be used to calculate an updated estimate 210 of the objective function 200 by calculating the predictive mean of the Gaussian distribution conditioned on the previous four evaluations of the objective function and a measure of uncertainty associated with the estimate 210 by calculating the predictive covariance based on the previous four evaluations of the objective functions. The measure of uncertainty is illustrated in FIG. 2B by the shaded region shown between curves 211 and 213. As may be seen from FIG. 2B, the changes to the probabilistic model are most pronounced around the region of the new evaluation—the estimate 210 passes through value 208 (unlike estimate 205 shown in FIG. 2A) and the uncertainty associated with the estimate in the region of value 208 shrinks. Accordingly, the probabilistic model represents the objective function 200 with higher fidelity in the region straddling evaluation value 208 than it did prior to the additional evaluation of the objective function.

Figure 2C:
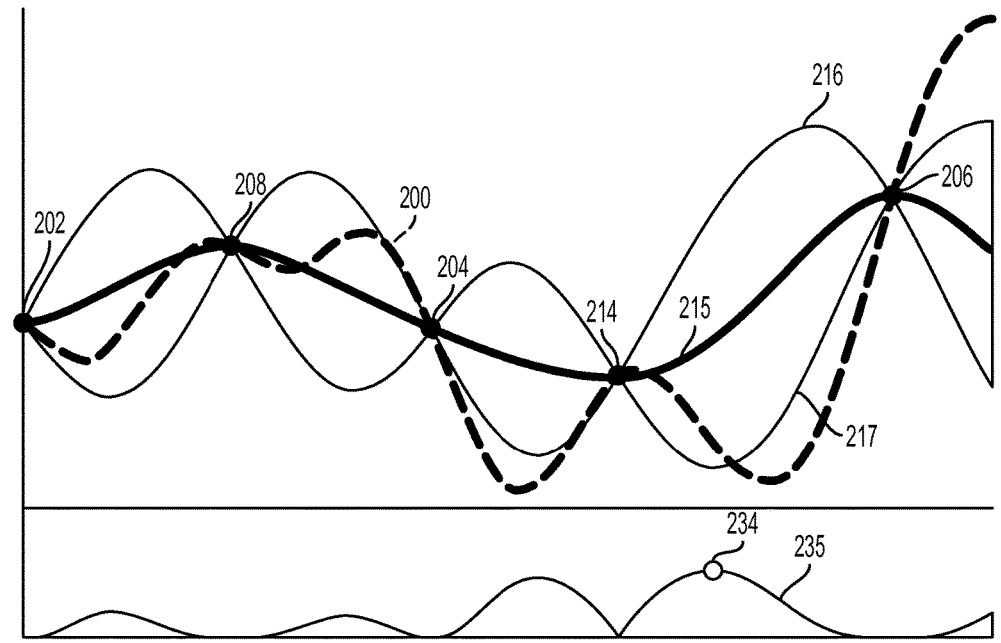

FIG. 2C illustrates the probabilistic model of the objective function 200, after the probabilistic model has been updated based on an additional evaluation of the objective function 200 at a new point to obtain respective objective function value 214. The updated probabilistic model may be used to calculate an updated estimate 215 of the objective function 200 by calculating the predictive mean of the Gaussian distribution conditioned on the previous five evaluations of the objective function and a measure of uncertainty associated with the estimate 215 by calculate the predictive covariance based on the previous five evaluations of the objective functions. The measure of uncertainty is illustrated in FIG. 2C by the shaded region shown between curves 216 and 217. As may be seen from FIG. 2C, the changes to the probabilistic model are most pronounced around the region of the new evaluation—the estimate 215 passes through value 214 (unlike the estimates 205 and 210 shown in FIGS. 2A and 2B, respectively) and the uncertainty associated with the estimate in the region of value 214 shrinks. Accordingly, the probabilistic model represents the objective function 200 with higher fidelity in the region straddling evaluation value 214 than it did prior to the additional evaluation of the objective function.

Figure 2D:
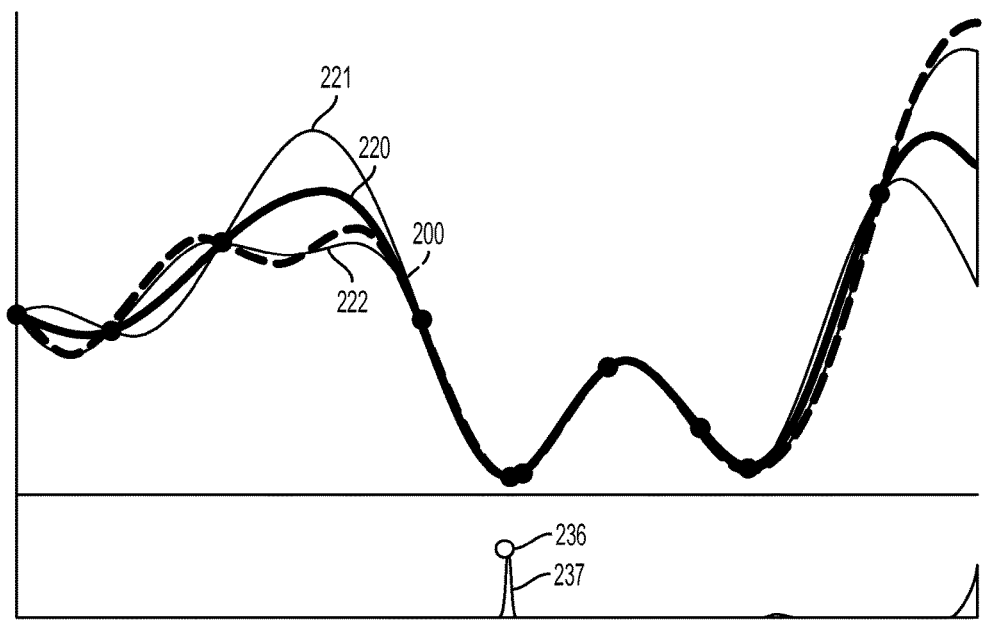

FIG. 2D illustrates the probabilistic model of objective function 200, after the probabilistic model has been updated based on multiple additional evaluations of the objective function 200. The updated probabilistic model may be used to calculate an updated estimate 220 of the objective function 200 and an associated measure of uncertainty based on all of the previous evaluations of the objective function. The measure of uncertainty is illustrated in FIG. 2D by the shaded region shown between curves 220 and 221. As may be seen from FIG. 2D, the probabilistic model represents the objective function 200 with greater fidelity as a result of the incorporating information about the objective function obtained during additional evaluations.

It should be appreciated that the examples shown in FIGS. 2A-2D are merely illustrative and non-limiting, as the entire objective function may not be known in practice; only point-wise evaluations may be available. The entire objective function 200 is shown here to help illustrate how additional evaluations of the objective function can be used to update the probabilistic model of the objective function. It should also be appreciated that although the illustrative objective function 200 is one dimensional in the examples of FIGS. 2A-2D, this is not a limitation of the technology described herein. An objective function may be defined on a domain of any suitable dimension d (e.g., d is at least two, d is at least three, d is at least five, d is at least 10, d is at least 25, d is at least 50, d is at least 100, d is at least 500, d is at least 1000, d is in between 10-100, d is in between 25 and 500, d is in between 500 and 5000, etc.). For example, an objective function representing the relationship between hyper-parameter values of a machine learning system and values indicative of the performance of the machine learning system configured with the hyper-parameter values may be defined on a domain whose dimensionality is equal to the number of hyper-parameters used to configure the machine learning system.

As illustrated above, a probabilistic model of an objective function may be updated based on one or more evaluations of the objective function. Although the objective function may be updated based on evaluation of the objective function at any point(s), evaluating the objective function at some points may provide more information about the objective function and/or extremal points of the objective function than at other points. As one example, the objective function may be evaluated at one or more points that provide information about regions of the objective function that have not been sufficiently explored (e.g., points far away from points at which the objective function has been evaluated, points at which the probabilistic model of the objective function is most uncertain about the objective function, etc.). As another example, the objective function may be evaluated at one or more points that provide information about regions of the objective function believed to contain an extremal point (e.g., a local minimum, a local maximum, a global minimum, a global maximum, etc.), which information may be useful in solving the underlying optimization.

As one non-limiting example, evaluating an objective function relating hyper-parameters of a machine learning system (e.g., a machine learning system comprising one or more neural networks to perform object recognition) to performance of the machine learning system when configured with the hyper-parameters at some points (for some values of hyper-parameters of the machine learning system) may provide more information about the objective function and/or extremal points of the objective function than at other points. Evaluating the performance of the machine learning system for some hyper-parameter values may provide information about regions of the objective function that have not been sufficiently explored. For example, evaluating performance of the machine learning system (evaluating the objective function) at hyper-parameter values far away, according to a suitable distance metric, from hyper-parameter values for which performance of the machine learning system has been evaluated may provide information about regions of the objective function not previously explored (e.g., akin to a global exploration of the space of hyper-parameter values). As another example, evaluating performance of the machine learning system for hyper-parameter values at which the estimate of the performance provided by the probabilistic model of the objective function is associated with a high variance such that there is uncertainty (e.g., at least a threshold amount of uncertainty) associated with the probabilistic model's belief for how well the machine learning system would perform for a given set of hyper-parameter values. As another example, evaluating performance of a machine learning system for hyper-parameter values close the hyper-parameter values for which the performance of the machine learning system is believed to be good (e.g., best performance for any of the hyper-parameter values previously seen), may lead to discovery of hyper-parameter values for which the performance of the machine learning system is even better (e.g., akin to local exploration of the space of hyper-parameter values).

Accordingly, in some embodiments, given a probabilistic model of an objective function estimated based on one or more previously-completed evaluations of the objective function, an informed decision may be made about which point(s) to evaluate the objective function next. That decision may balance the goals of global exploration (e.g., exploring regions of the objective function where there are few evaluations and/or where the uncertainty associated with objective function estimates provided by the probabilistic model may be high) and local exploration (e.g., exploring regions of the objective function near one or more local/global maxima and/or minima).

In some embodiments, the next point(s) at which to evaluate the objective function may be selected by using an acquisition utility function that associates each of one or more points for which the objective function may be evaluated to a value representing the utility of evaluating the objective function at that point. For example, when the objective function relates values of hyper-parameters of a machine learning system to its performance, the acquisition utility function may associate each set of hyper-parameter values to a value representing the utility of evaluating the performance of the machine learning system for that set of hyper-parameter values.

An acquisition utility function may be used in any suitable way to select the next point to be evaluated. In some embodiments, the next point at which to evaluate the objective function may be selected as the point that maximizes the acquisition utility function (or minimizes the acquisition utility function depending on how such a utility function is defined). Any suitable acquisition utility function may be used and may express any of numerous types of measures of utility (including measures of utility that suitably balance local and global types of exploration described above).

In some embodiments, the acquisition utility function may depend on the probabilistic model of the objective function. The acquisition utility function may be specified based on current information about the objective function captured by the probabilistic model. For example, the acquisition utility function may be specified based at least in part on an estimate of the objective function that may be obtained from the probabilistic model (e.g., predictive mean), the measure of uncertainty associated with the estimate (e.g., predictive covariance), and/or any other suitable information obtained from the probabilistic model.

FIGS. 2A-2D illustrate using an acquisition utility function to select points at which to evaluate the objective function based at least in part on the probabilistic model of the objective function. The acquisition utility function selects points to evaluate by balancing two goals: global exploration (whereby points for evaluation are selected to reduce uncertainty in the probabilistic model of the objective function) and local exploration (whereby points for evaluation are selected to explore regions of the objective function believed to contain at least one extremal point of the objective function. For example, as shown in FIG. 2A, the probability model of the objective function 200 may be used to calculate estimate 205 of the objective function and an associated measure of uncertainty shown by the shaded region between curves 207 and 209. The values of the acquisition utility function 231, calculated based on estimate 205 and the associated measure of uncertainty, are shown in the lower portion of FIG. 2A. As shown, the acquisition utility function 231 takes on larger values in regions where the uncertainty associated with estimate 205 is larger (e.g., between values 202 and 204, and between values 204 and 206) and smaller values in regions where the uncertainty associated with estimate 205 is smaller (e.g., around values 202, 204, and 206). The next point at which to evaluate the objective function is selected as the point at which the acquisition utility function 231 takes on its maximum value (i.e., value 230), and the probabilistic model of the objective function is updated based on the evaluation of the objective function at the selected point.

Since the acquisition utility function depends on the probabilistic model, after the probabilistic model of the objective 200 is updated so is the acquisition utility function. Updated acquisition utility function 233 is calculated based on estimate 210 and the associated measure of uncertainty, and is shown in the lower portion of FIG. 2B. As can be seen, the acquisition utility function 233 takes on larger values in regions where the uncertainty associated with estimate 210 is larger (e.g., between values 204 and 206) and smaller values in regions where the uncertainty associated with estimate 205 is smaller (e.g., around values 202, 204, 206, and 208). The next point at which to evaluate the objective function is selected as the point at which the acquisition utility function 233 takes on its maximum value (i.e., value 232), and the probabilistic model of the objective function is updated based on the evaluation of the objective function at the selected point.

FIG. 2C illustrates updated acquisition utility function 235, which is calculated based on estimate 215 and its associated measure of uncertainty. Similar to the examples shown in FIGS. 2A and 2B, the acquisition utility function 235 takes on larger values in regions where the uncertainty associated with estimate 215 is larger. The next point at which to evaluate the objective function is selected as the point at which the acquisition utility function 235 takes on its maximum value (i.e., value 234).

FIG. 2D illustrates updated acquisition utility function 237, which is calculated based on estimate 220 and its associated measure of uncertainty. In this example, the acquisition utility function 237 does not take on larger values in regions where the uncertainty associated with estimate 220 is largest. Rather the function 237 takes on larger values near the point where the probabilistic model of the objective function indicates that the objective function is likely to have a local and/or global minimum (value 225). Although there are regions of uncertainty associated with estimate 220, none is large enough to capture points at which the value of the objective function is smaller than value 225. Since the goal, in this example, is to identify a minimum value of the objective function, there is little additional value in exploring regions of uncertainty associated with estimate 220, as it would be very unlikely in those regions to find points at which the objective function takes on values smaller than value 225. Rather, the acquisition utility function indicates that it would be more useful to evaluate the objective function around the point where the objective function likely takes on the smallest values, so that a point at which the objective function takes on an even lower value than value 225 may be identified.

In some embodiments, an acquisition utility function may depend on one or more parameters of the probabilistic model (denoted by $\theta$) used to model the objective function, previous points at which the objective function was evaluated (denoted by $\{x_n, 1 \leq n \leq N\}$, and the results of those evaluations (denoted by $\{y_n, 1 \leq n \leq N\}$). Such an acquisition function and its dependencies may be denoted by $a(x; \{x_n, y_n\}; \theta)$. One non-limiting example of an acquisition utility function that depends on one or more parameters of the probabilistic model is the probability of improvement acquisition utility function. The probability of improvement acquisition utility function aims to select the next point at which to evaluate the objective function so as to maximize the probability that the evaluation of the objective function will provide an improvement over the best current value of the objective function (e.g., select the next set of hyper-parameter values at which to evaluate performance of a machine learning system so as to maximize the probability that evaluating the performance of a machine learning system with those hyper-parameter values will lead to better performance of the machine learning system than for any previously-tried hyper-parameter values). When the probabilistic model of the objective function comprises a Gaussian process, the probability of improvement utility function $a_{PI}$ may be expressed as:

$$a_{PI}(x; \{x_n, y_n\}, \theta) = \Phi(\gamma(x)) \quad (4)$$

$$\gamma(x) = \frac{f(x_{best}) - \mu(x; \{x_n, y_n\}, \theta)}{\sigma(x; \{x_n, y_n\}, \theta)} \quad (5)$$

where $\Phi(\cdot)$ is the cumulative distribution function of the standard normal random variable, and where $\mu(x; \{x_n,y_n\},\theta)$ and $\sigma^2(x; \{x_n,y_n\},\theta)$ denote the predictive mean and predictive variance of the Gaussian process, respectively.

Another non-limiting example of an acquisition utility function that depends on one or more parameters of the probabilistic model is the expected improvement acquisition utility function. The expected improvement utility acquisition function aims to select the next point at which to evaluate the objective function so at to maximize the expected improvement over the best current value of the objective function. When the probabilistic model of the objective function comprises a Gaussian process, the expected improvement utility acquisition function $a_{EI}$ may be expressed as:

$$a_{EI}(x; \{x_n,y_n\}, \theta) = \sigma(x; \{x_n,y_n\}, \theta)(\gamma(x)\Phi(\gamma(x)) + \mathcal{N}(\gamma(x); 0,1)) \quad (6)$$

where $N(\ )$ is the probability density function of the standard normal random variable.

Another non-limiting example of an acquisition utility function that depends on one or more parameters of the probabilistic model is the regret minimization acquisition function (sometimes termed the "lower confidence bound" acquisition function). When the probabilistic model of the objective function comprises a Gaussian process, the regret minimization acquisition function may be expressed according to:

$$a_{LCB}(x; \{x_n,y_n\}, \theta) = \mu(x; \{x_n,y_n\}, \theta) - \kappa\sigma(x; \{x_n,y_n\}, \theta) \quad (7)$$

where $\kappa$ is tunable parameter for balance local and global exploration.

Another non-limiting example of an acquisition utility function is the entropy search acquisition utility function. The entropy search acquisition utility function aims to select the next point at which to evaluate the objective function so at to decrease the uncertainty as to the location of the minimum of the objective function (or, equivalently, as to the location of the maximum of the objective function multiplied by negative one). To this end, the next point at which to evaluate the objective function is selected by iteratively evaluating points that will decrease the entropy of the probability distribution over the minimum of the objective function. The entropy search acquisition utility function may be expressed as follows. Given a set of C points $\tilde{X}$, the probability of a point $x \in \tilde{X}$ having the minimum objective function value may be expressed according to:

$$Pr(\min \text{ at } x \mid \theta, \tilde{X}, \{x_n, y_n\}_{n=1}^N) = \int_{\mathbb{R}^C} p(f \mid x, \theta, \{x_n, y_n\}_{n=1}^N) \prod_{\tilde{x} \in \tilde{X} \setminus x} h(f(\tilde{x}) - f(x)) df. \quad (8)$$

where f is the vector of objective function values at the points, $\tilde{X}$, $h(\ )$ is the Heaviside step function, $p(f|x,\theta,\{x_n, y_n\}_{n=1}^N)$ is the posterior probability of the values in the vector f given the past evaluations of the objective function, and $p(y|f)$ is the likelihood that the objective function takes on the value y according to the probabilistic model of the objective function. The entropy search acquisition function $a_{KL}$ may then be written as follows:

$$a_{KL}(x) = \iint [H(P_{min}) - H(P_{min}^y)] p(y|f) p(f|x) dy df. \quad (9)$$

where $P_{min}^y$ indicates that the fantasized observation $\{x, y\}$ has been added to the set of observations, $p(f|x)$ represents $p(f|x,\theta,\{x_n,y_n\}_{n=1}^N)$, $H(P)$ represents entropy of P, and $P_{min}$ represents $Pr(\min \text{ at } x|\theta,\tilde{X},\{x_n,y_n\}_{n=}^N)$.

Each of the above-described examples of an acquisition utility function depends on parameters $\theta$ of the probabilistic model. As discussed above, the inventors have recognized that performing Bayesian optimization (e.g., to identify hyper-parameter values for a machine learning system) by using an acquisition utility function that depends on the parameters of the probabilistic model may lead to poor overall performance. For example, a probabilistic model comprising a d-dimensional Gaussian process (e.g., used for modeling a d-dimensional objective function, for example, from d hyper-parameter values to respective machine learning system performance) may be associated with d+3 parameters including, d length scales, covariance amplitude, observation noise variance, and constant mean. In practice, the values of the probabilistic model parameters $\theta$ are set using various procedures, but the performance of the overall optimization is sensitive to how the parameters are set.

Accordingly, in some embodiments, an integrated acquisition utility function is used, which may be less sensitive to parameters of the probabilistic model of the objective function.

In some embodiments, an integrated acquisition utility function may be obtained by selecting an initial acquisition utility function that depends on parameters of the probabilistic model (e.g., any of the above-described utility functions may be used as the initial acquisition utility function) and calculating the integrated acquisition utility function by integrating (marginalizing) out the effect of one or more of the parameters on the initial acquisition utility function. For example, the integrated acquisition utility function may be calculated as a weighted average (e.g., a weighted integral) of instances of the initial acquisition utility function, with each instance of the initial acquisition utility function corresponding to a particular parameter values of the probabilistic model, and each weight corresponding to the likelihood of the particular parameter values given the previously obtained objective function evaluations.

For example, an integrated acquisition utility function $\hat{a}(x; \{x_n, y_n\})$ may be calculated by selecting an initial acquisition utility function $a(x; \{x_n, y_n\}, \theta)$ that depends on the probabilistic model parameters $\theta$, and calculating $\hat{a}(x; \{x_n, y_n\})$ by integrating (averaging) out the parameters $\theta$ in proportion to the posterior probability of $\theta$ according to:

$$a(x;\{x_n,y_n\}) = \int a(x;\{x_n,y_n\},\theta) p(\theta|\{x_n,y_n\}_{n=1}^N) d\theta \qquad (10)$$

where the weight $$p(\theta|\{x_n,y_n\}_{n=1}^N) \qquad (11)$$

represents the posterior probability of the parameters $\theta$ according to the probabilistic model given the N evaluations at points $\{x_n; 1 \le n \le N\}$ and the results of those evaluations $\{y_n; 1 \le n \le N\}$.

Figure 3A:
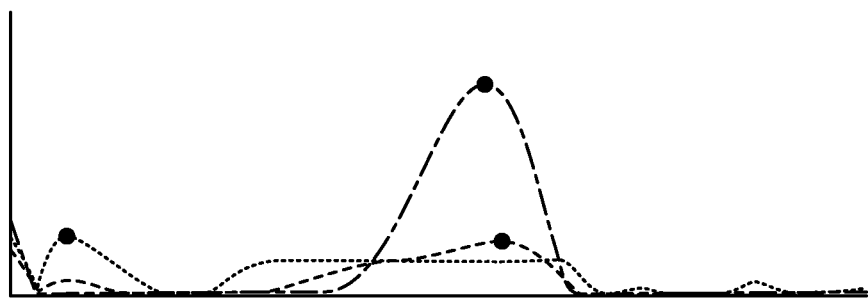
FIGS. 3A-3B illustrate calculating an integrated acquisition utility function, in accordance with some embodiments of the technology described herein.
Figure 3B:
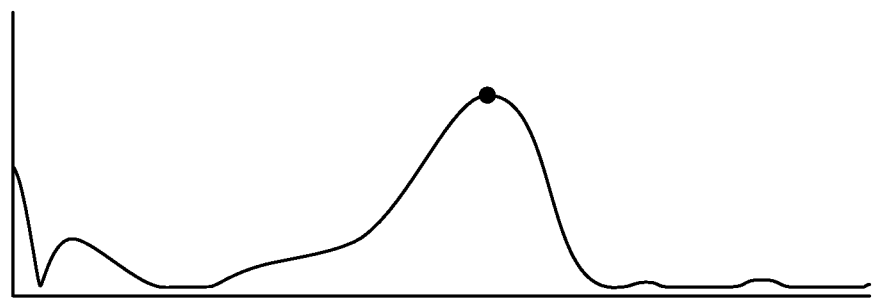

The calculation of an integrated acquisition utility function is further illustrated in FIGS. 3A and 3B. FIG. 3A illustrates three instances of an initial acquisition utility function calculated for three different sets of parameter values for the underlying probabilistic model. Each instance was calculated based on the same set of evaluations of the objective function. FIG. 3B illustrates the integrated acquisition utility function obtained by weighted averaging of the three instances of the initial acquisition utility function shown in FIG. 3A. In the average, the weight corresponding to a particular instance of the initial acquisition function corresponds to the likelihood of the probabilistic model parameter values used to generate the particular instance of the initial acquisition function.

As may be appreciated from the above discussion, an integrated acquisition utility function does not depend on values of the probabilistic model parameters $\theta$ (though it still depends on previous evaluations of the objective function). As a result, the integrated acquisition utility function is not sensitive to values of the parameters of the probabilistic model, which the inventors have observed to improve the robustness and performance of conventional Bayesian optimization techniques.

In some embodiments, the integrated acquisition utility function may be calculated in closed form. However, in embodiments where the integrated acquisition utility function may not be obtained in closed form, the integrated acquisition utility function may be estimated using numerical techniques. For example, in some embodiments, Monte Carlo simulation techniques may be used to approximate the integrated acquisition utility function and/or find a point (or an approximation to the point) at which the integrated acquisition utility function attains its maximum. Any suitable Monte Carlo simulation techniques may be employed including, but not limited to, rejection sampling techniques, adaptive rejection sampling techniques, importance sampling techniques, adaptive importance sampling techniques, Markov chain Monte Carlo techniques (e.g., slice sampling, Gibbs sampling, Metropolis sampling, Metropolis-within-Gibbs sampling, exact sampling, simulated tempering, parallel tempering, annealed sampling, population Monte Carlo sampling, etc.), and sequential Monte Carlo techniques (e.g., particle filters).

Figure 4:
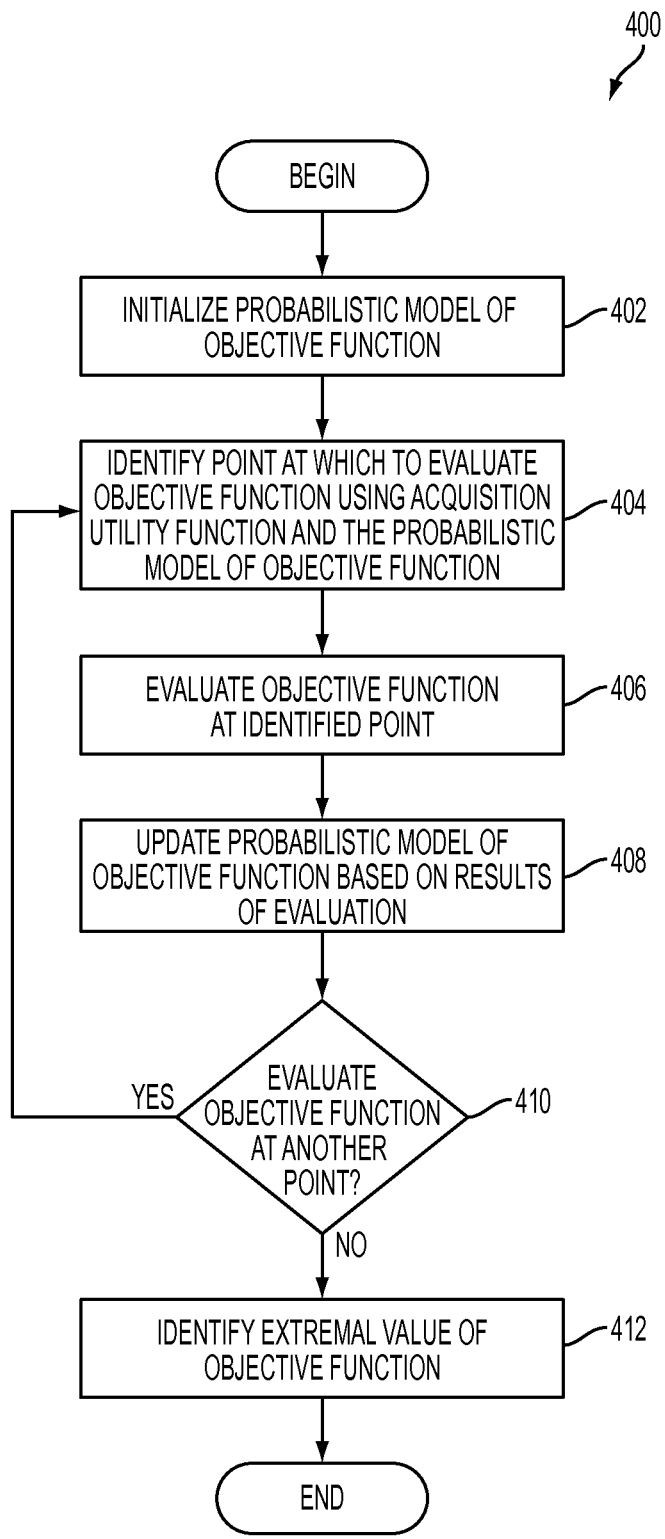
FIG. 4 is a flow chart of an illustrative process for performing optimization using an objective function at least in part by using an integrated acquisition function and a probabilistic model of the objective function, in accordance with some embodiments of the technology described herein.
Figure 5:
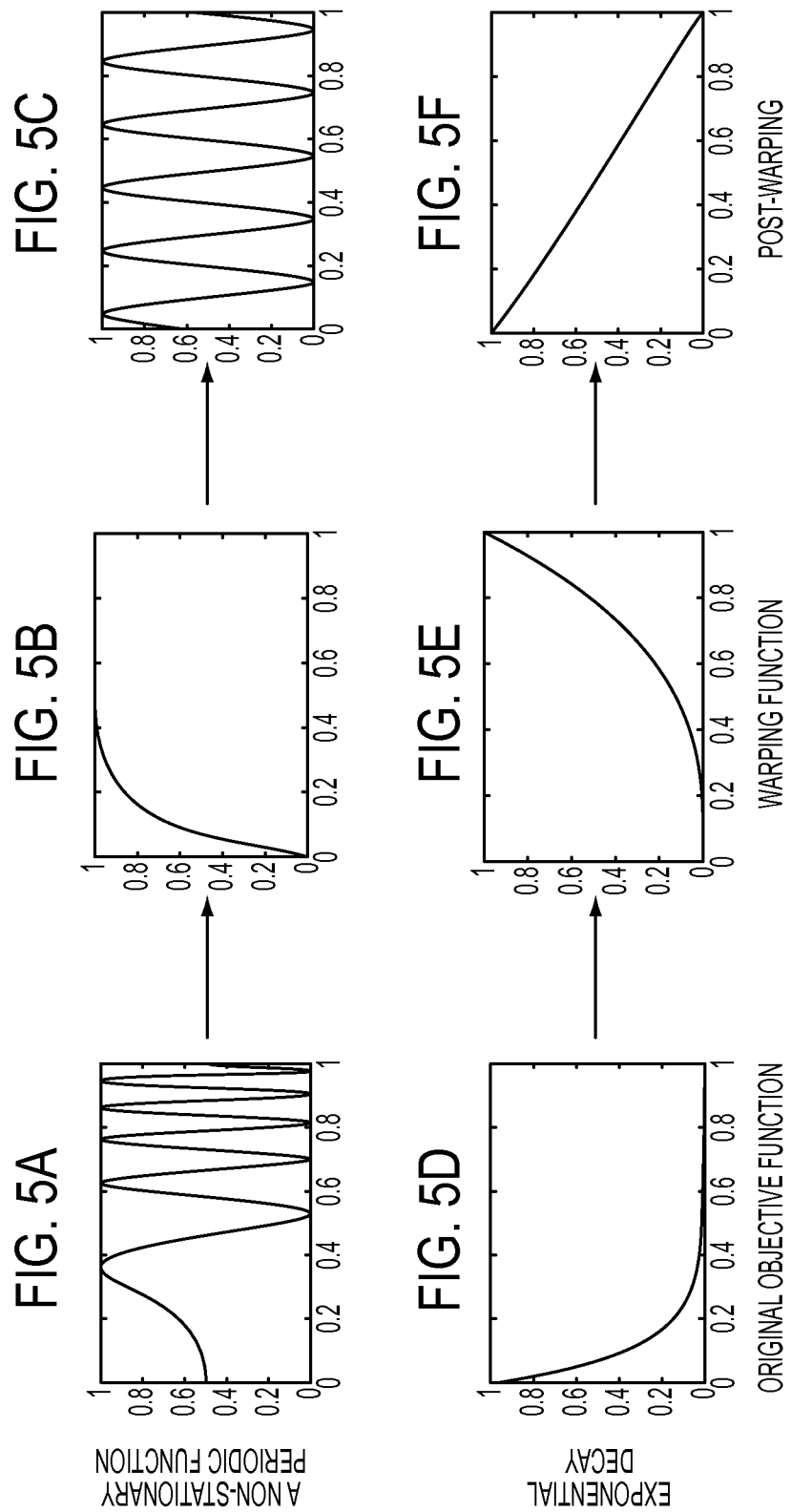
FIGS. 5A-5F illustrate applications of two warping functions to two illustrative non-stationary objective functions.

FIG. 4 is a flow chart of an illustrative process 400 for performing optimization using an objective function at least in part by using an integrated acquisition function and a probabilistic model of the objective function, in accordance with some embodiments of the technology described herein. That is, process 400 may be used to identify an extremal point (e.g., a local minimum, local maximum, global minimum, global maximum, etc.) of the objective function using the techniques described herein. Process 400 may be performed using any suitable computing device(s) comprising one or multiple computer hardware processors, as aspects of the technology described herein are not limited in this respect.

In some embodiments, process 400 may be applied to identifying (e.g., locating or approximating the locations of) one or more extremal points of an objective function relating values of hyper-parameters of a machine learning system to respective values providing a measure of performance of the machine learning system. Process 400 may be used for setting values of hyper-parameters of any of the machine learning systems described herein and/or any other suitable machine learning systems. Additionally or alternatively, process 400 may be applied to identifying (e.g., locating or approximating the locations of) one or more extremal points of an objective function arising in any other suitable optimization problem, examples of which have been provided.

Process 400 begins at act 402, where a probabilistic model of the objective function is initialized. In some embodiments, the probabilistic model of the objective function may comprise a Gaussian process. In some embodiments, the probabilistic model of the objective function may comprise a neural network. In some embodiments, the probabilistic model of the objective function may comprise an adaptive basis function regression model (linear or non-linear). Though, it should be appreciated that any other suitable type of probabilistic model of the objective function may be used, as aspects of the technology described herein are not limited by any particular type of probabilistic model of the objective function.

The probabilistic model of the objective function may be initialized by setting the values for one or more (e.g., all) of the parameters of the probabilistic model. The parameter(s) may be set to any suitable values, which in some instances may be based on any prior information available about the objective function, if any. The parameter values may be stored in memory or on any other suitable type of non-transitory computer-readable medium. In some embodiments, the initial values of the parameters may be initialized based at least in part on information obtained from previously-obtained evaluations of another objective function related, in some way, to the objective function. This is discussed in more detail below with respect to the multi-task optimization techniques.

Next, process 400 proceeds to act 404, where a point at which to evaluate the objective function is identified. For example, when the objective function relates values of hyper-parameters of a machine learning system to its performance, a set of hyper-parameter values for which to evaluate performance of the machine learning system may be identified at act 404. The identification may be performed at least in part by using an acquisition utility function and a probabilistic model of the objective function. In some embodiments, an acquisition utility function that depends on parameters of the probabilistic model may be used at act 404 such as, for example, a probability of improvement acquisition utility function, an expected improvement acquisition utility function, a regret minimization acquisition utility function, and an entropy-based acquisition utility function. However, in other embodiments, an integrated acquisition utility function may be used at act 404.

As described above, the integrated utility function may be obtained by selecting an initial acquisition utility function that depends on one or more parameters of the probabilistic model (e.g., a probability of improvement utility function, expected improvement utility function, regret minimization utility function, entropy-based utility function, etc.), and calculating the integrated utility function by integrating the initial acquisition function with respect to one or more of the probabilistic model parameters (e.g., as indicated above in Equation 10).

In some embodiments, the point at which to evaluate the objective function may be identified as the point (or as approximation to the point) at which the acquisition utility function attains its maximum value. In some embodiments, the point at which the acquisition function attains its maximum may be identified exactly (e.g., when the acquisition utility function is available in closed form). In some embodiments, however, the point at which the acquisition utility function achieves its maximum value may be not be identified exactly (e.g., because acquisition utility function is not available in closed form), in which case the point at which the acquisition utility function attains its maximum value may be identified or approximated using numerical techniques. For example, in some embodiments, an integrated acquisition utility function may not be available in closed form and Monte Carlo techniques may be employed to identify or approximate the point at which the integrated acquisition utility function attains its maximum value.

In some embodiments, Markov chain Monte Carlo methods may be used to identify or approximate the point at which the integrated acquisition utility function attains its maximum value. For example, the integrated acquisition utility function may be defined according to the integral in Equation 10 above, which integral may be approximated using Markov chain Monte Carlo techniques (and/or any other suitable Monte Carlo procedure). In some embodiments, the integral may be approximated by generating samples of probabilistic model parameter values (in proportion to their posterior probability given any previously-obtained evaluations of the objective function), evaluating the initial acquisition utility function at the generated samples, and using the resultant evaluations to approximate the integrated acquisition utility function and/or to identify or approximate a point at which the integrated acquisition utility function attains its maximum value. Further details for how to identify or approximate a maximum value of the integrated acquisition utility function are provided below.

It should be appreciated that the point at which to evaluate the objective function is not limited to being a point (or an approximation to the point) at which the acquisition utility function attains its maximum and may be any other suitable point obtained by using the acquisition utility function (e.g., a local maximum of the acquisition utility function, a local or a global minimum of the acquisition utility function, etc.).

After the point at which to evaluate the objective function is identified at act 404, process 400 proceeds to act 406, where the objective function is evaluated at the identified point. For example, when the objective function relates hyper-parameter values of a machine learning system to its performance, performance of the machine learning system configured with the hyper-parameters identified at act 404 may be evaluated at act 406.

After the objective function is evaluated, at act 406, at the point identified at act 408, process 400 proceeds to act 408, where the probabilistic model of the objective function is updated based on results of the evaluation. The probabilistic model of the objective function may be updated in any of numerous ways based on results of the new evaluation obtained at act 406. As one non-limiting example, updating the probabilistic model of the objective function may comprise updating (e.g., re-estimating) one or more parameters of the probabilistic model based on results of the evaluation performed at act 406. As another non-limiting example, updating the probabilistic model of the objective function may comprise updating the covariance kernel of the probabilistic model (e.g., when the probabilistic model comprises a Gaussian process, the covariance kernel of the Gaussian process may be updated based on results of the new evaluation). As another non-limiting example, updating the probabilistic model of the objective function may comprise computing an updated estimate of the objective function using the probabilistic model (e.g., calculating the predictive mean of the probabilistic model based on any previously-obtained evaluations of the objective function and results of the evaluation of the objective function at act 406). As another non-limiting example, updating the probabilistic model of the objective function may comprise calculating an updated measure of uncertainty associated with the updated estimate of the objective function (e.g., calculating the predictive covariance of the probabilistic model based on any previously-obtained evaluations of the objective function and results of the evaluation of the objective function at act 406). As yet another non-limiting example, updating the probabilistic model may comprise, simply, storing results of the evaluation such that results of the evaluation may be used subsequently when performing computations using the probabilistic model of the objective function (e.g., calculating an estimate of the objective function, updating one or more parameters of the probabilistic model, etc.).

After the probabilistic model of the objective function is updated at act 408, process 400 proceeds to decision block 410, where it is determined whether the objective function is to be evaluated at another point. This determination may be made in any suitable way. As one non-limiting example, process 400 may involve performing no more than a threshold number of evaluations of the objective function and when that number of evaluations has been performed, it may be determined that the objective function is not to be evaluated again (e.g., due to time and/or computational cost of performing such an evaluation). On the other hand, when fewer than the threshold number of evaluations has been performed, it may be determined that the objective function is to be evaluated again. As another non-limiting example, the determination of whether to evaluate the objective function again may be made based on one or more previously-obtained values of the objective function. For example, if the optimization involves finding an extremal point (e.g., a maximum) of the objective function and the values of the objective function have not increased by more than a threshold value over the previous iterations (e.g., a threshold number of previously performed evaluations), a determination may be made to not evaluate the objective function again (e.g., because further evaluations of the objective function are unlikely to identify points at which the objective function takes on values greater than the values at points at which the objective function has already been evaluated). Though, the determination of whether to evaluate the objective function again may be made in any other suitable way, as aspects of the technology described herein are not limited in this respect.

When it is determined, at decision block 410, that the objective function is to be evaluated again, process 400 returns, via the YES branch, to act 404, and acts 404-408 are repeated. On the other hand, when it is determined at decision block 408 that the objective function is not to be evaluated again, process 400 proceeds to act 412, where an extremal value of the objective function may be identified based on the one or more values of the objective function obtained during process 400.

At act 412, an extremal value of the objective function may be identified in any suitable way based on the obtained value(s) of the objective function. As one non-limiting example, the extremal value (e.g., a maximum) may be selected to be one of the values obtained during evaluation (e.g., by taking a maximum of the values of the objective function obtained during process 400). As another non-limiting example, the extremal value (e.g., a maximum) may be obtained using a functional form fitted to the values of the objective function obtained during process 400 (e.g., a kernel density estimate of the objective function, a maximum of the estimate of the objective function obtained based on the probabilistic model, etc.). After the extremal value of the objective function is identified at act 412, process 400 completes.

As discussed above, in some embodiments, Monte Carlo methods may be used to identify and/or approximate the point at which the integrated acquisition utility function attains its maximum value. One non-limiting example of how such calculations may be performed is detailed below.

Let f(x) denote the objective function and the set X denote the set of points on which the objective function may be calculated. Assuming that the objective function has been evaluated N times, we have as input $\{x_n, y_n\}_{n=1}^{N}$, where each $x_n$ represents a point at which the objective function has been evaluated and $y_n$ represents the corresponding value of the objective function (i.e., $y_n=f(x_n)$). Let p( ) denote the probabilistic model of the objective function.

The integrated acquisition utility function may be given according to:

$$h(x) = \int_x \psi(y, y^*) \int_\Theta p(y|x, \{x_n, y_n\}_{n=1}^N, \theta) p(\theta|\{x_n, y_n\}_{n=1}^N) d\theta dy \quad (12)$$

where $$p(y=f(x)|x, \{x_n, y_n\}_{n=1}^N, \theta) \quad (13)$$

is the marginal predictive density obtained from the probabilistic model of the objective function given $\{x_n, y_n\}_{n=1}^N$ and parameters $\theta$ of the probabilistic model, $p(\theta|\{x_n, y_n\}_{n=1}^N)$ is the likelihood of the probabilistic model given $\{x_n, y_n\}_{n=1}^n$, and where $\psi(y, y^*)$ corresponds to a selection heuristic. For example, the probability of improvement and expected improvement heuristics may be represented, respectively, according to:

$$\psi(y, y^*) = 1_{y \leq y^*} \quad (14)$$

$$\psi(y, y^*) = (y^* - y) 1_{y \leq y^*} \quad (15)$$

As discussed above, in some instances, the integrated acquisition utility function of Equation 12 may not be obtained in closed form (e.g., it may not be possible to calculate the integral with respect to the parameters $\theta$ in closed form). Accordingly, the integrated acquisition utility function of Equation 12 may be approximated by the following numerical procedure.

Initially, for each $1 \leq j \leq J$, draw a sample $\theta^{(j)}$ according to:

$$\theta^{(j)} \sim p(\theta|\{x_n, y_n\}_{n=1}^N) \quad (16)$$

where, by Bayes rule, $$p(\theta|\{x_n, y_n\}_{n=1}^N) = \frac{p(\theta) p(\{y_n\}_{n=1}^N | \{x_n\}_{n=1}^N, \theta)}{p(\{y_n\}_{n=1}^N | \{x_n\}_{n=1}^N)} \quad (17)$$

Any suitable Monte Carlo technique may be used to draw samples according to Equation 16 including, but not limited, to inversion sampling, importance sampling, rejection sampling, and Markov chain Monte Carlo techniques (examples of which have been provided).

Given N samples $\{\theta^{(j)}; 1 \leq j \leq J\}$ drawn according to Equation 16, the integrated acquisition utility function may be approximated according to:

$$h(x) \approx \frac{1}{J} \sum_{j=1}^{J} \int_\mathbb{R} \psi(y, y^*) p(y|x, \{x_n, y_n\}_{n=1}^N, \theta^{(j)}) dy \quad (18)$$

The approximation of the integrated acquisition utility function computed via Equation 18 may be used to identify a point which is or (is an approximation of) a point at which the integrated acquisition utility function attains its maximum value. The objective function may be evaluated at the identified point.

As discussed above, the inventors have recognized that conventional Bayesian optimization techniques utilize probabilistic models that are not suitable for accurately modeling some types of objective functions. For example, conventional Bayesian optimization techniques utilize stationary Gaussian processes for modeling objective functions (e.g., the covariance between two outputs is invariant to translations in input space), but a stationary Gaussian process may not be suitable for modeling a non-stationary objective function. For example, when the objective function relates hyper-parameter values of a machine learning system to its performance, a Gaussian process having a short-length scale may be more appropriate for modeling the objective function at points near its maximum value and a Gaussian process having a longer-length scale may be more appropriate for modeling the objective function at points farther away from its maximum value (e.g., because a machine learning system may perform equally poorly for all "bad" values of hyper-parameters, but its performance may be sensitive to small tweaks in "good" hyper-parameter regimes). In contrast, a stationary Gaussian process model would represent the objective function using the same length scale for all points on which the objective function is defined.

Accordingly, some embodiments are directed to performing Bayesian optimization by using a probabilistic model adapted to model stationary and non-stationary objective functions more faithfully. In some embodiments, the probabilistic model of the objective function may be specified based at least in part on a non-linear one-to-one mapping (sometimes termed "warping") of elements in the domain of the objective function, to account for non-stationarity of the objective function. For example, in embodiments where the objective function relates hyper-parameter values of a machine learning system to its performance, the probabilistic model may be specified based at least in part on a non-linear warping of the hyper-parameter values to account for the non-stationarity of the objective function.

In some embodiments, the probabilistic model of the objective function that accounts for non-linearity in the objective function may be specified as a composition of a non-linear one-to-one mapping with a stationary probabilistic model. For example, the probabilistic model of the objective function that accounts for non-linearity in the objective function may be specified as a composition of a nonlinear one-to-one mapping with a stationary Gaussian process. The covariance kernel of the Gaussian process may be specified at least in part by using the non-linear one-to-one mapping.

In embodiments, where the probabilistic model of the objective function is specified as a composition of a non-linear one-to-one mapping and a stationary probabilistic model, the composition may be expressed as follows. Let $g(x; \phi)$ denote a non-linear one-to-one mapping parameterized by one or more parameters $\phi$, and let $p(z; \theta)$ denote a stationary probabilistic model (e.g., a stationary Gaussian process) parameterized by the parameters $\theta$ (the points x and the points z may lie in the same domain or in different domains depending on the choice of non-linear one-to-one mapping $g(x; \phi)$)). Then the composition of the non-linear one-to-one mapping and the stationary probabilistic model may be used to obtain the probabilistic model given by $p(z=g(x; \phi); \theta)$ or $p(g(x; \phi); \theta)$ for short. Using the non-linear mapping $g(x; \phi)$ to transform the input z of a stationary probabilistic model, such as a stationary Gaussian process, allows the resultant probabilistic model to account for non-stationary effects in the objective function.

In some embodiments, the objective function may be a mapping of elements from a first domain to a range and the non-linear one-to-one mapping $g(x; \phi): X \rightarrow Z$ may be a mapping of elements in the first domain (e.g., the points x in X) to elements in a second domain (e.g., the points $z=g(x; \phi)$ in Z). For example, when the objective function relates values of hyper-parameters of a machine learning system to its performance, the first domain may comprise values of the hyper-parameters or suitably normalized values of the hyper-parameters (e.g., values of the hyper-parameters normalized to lie in a unit hyper-cube, unit ball, hyper-cube of a specified diameter, ball of a specified diameter, etc.), the range may comprise values indicative of performance of the machine learning system, and the second domain may comprise values obtained by applying the non-linear one-to-one mapping to hyper-parameter values in the first domain. That is, the second domain is the range of the non-linear one-to-one mapping. The first domain may be the same domain as the second domain (e.g., the first domain may be a unit hypercube and the second domain may be a unit hypercube; $X=Z$ using the notation above), though aspects of the technology described herein are not limited in this respect, as the first and second domains may be different (e.g., $X \neq Z$ using the notation above), in some embodiments.

In some embodiments, the non-linear one-to-one mapping may comprise a cumulative distribution function of a random variable. In some embodiments, the non-linear one-to-one mapping may comprise a cumulative distribution function of the Beta random variable. For example, the non-linear one-to-one mapping of points in d-dimensional space on which an objective function is defined (e.g., the space of hyper-parameter values of a machine learning system that has d hyper-parameters) may be specified coordinate-wise as follows:

$$w_d(x_d) = \text{Beta } CDF(x_d; \alpha_d, \beta_d), \qquad (19)$$

$$= \int_0^{x_d} \frac{u^{\alpha_d-1}(1-u)^{\beta_d-1}}{B(\alpha_d, \beta_d)} du,$$

where $x_d$ is the value of x at its $d^{th}$ coordinate, BetaCDF refers to the cumulative distribution function (CDF) of the Beta random variable, and $B(\alpha_d, \beta_d)$ is the normalization constant of the Beta CDF. The Beta CDF is parameterized by positive-valued ("shape") parameters $\alpha_d$ and $\beta_d$. It should be appreciated that the non-linear one-to-one mapping is not limited to comprising the cumulative distribution function of a Beta random variable and may instead comprise the cumulative distribution function of Kumaraswamy random variable, Gamma random variable, Poisson random variable, Binomial random variable, Gaussian random variable, or any other suitable random variable. It should also be appreciated that the non-linear one-to-one mapping is not limited to being a cumulative distribution function and, for example, may be any suitable monotonically increasing or monotonically decreasing function, any suitable bijective function (e.g., any suitable bijective function having the d-dimensional hypercube as the domain and range for integer $d \geq 1$).

In some embodiments, the non-linear one-to-one mapping may comprise a combination (e.g., a composition or any other suitable type of combination) of two or more non-linear one-to-one mappings. For example, the non-linear one-to-one mapping may comprise a combination of two or more cumulative distribution functions. As one non-limiting example, the non-linear one-to-one mapping may comprise a combination of cumulative distribution function of the Beta distribution and a cumulative distribution function of the Kumaraswamy distribution.

Illustrative non-limiting examples of how a non-linear one-to-one mapping warps a non-stationary objective function are shown in FIGS. 5A-5F. As one example, a non-stationary one-dimensional periodic objective function shown in FIG. 5A may be transformed by application of the non-linear bijective warping shown in FIG. 5B to obtain a stationary periodic objective function shown in FIG. 5C. As another example, a non-stationary one-dimensional exponential objective function shown in FIG. 5D may be transformed by application of the non-linear bijective warping shown in FIG. 5E to obtain a stationary periodic objective function shown in FIG. 5F. It should be appreciated that these two examples are illustrative and non-limiting and that objective functions to which the techniques described herein may be applied to are not limited to being one-dimensional objective functions, let alone the two illustrative one-dimensional objective functions shown in FIGS. 5A-5F.

The inventors have recognized there are many different non-linear warpings that may be used to specify a probabilistic model of an objective function. Since the nature of the non-stationarity (if any) of the objective function may not be known in advance, a technique is needed in order to select the appropriate non-linear warping to use for specifying the probabilistic model. Accordingly, in some embodiments, a non-linear warping may be inferred based, at least in part, one or more evaluations of the objective function (e.g., the maximum a posteriori estimate of the parameters of the non-linear warping given results of all evaluations may be used to determine the non-linear warping) and the probabilistic model of the objective function may be specified by using the non-linear warping.

In some embodiments, the probabilistic model of the objective function may be specified as a function of a family of non-linear warpings, the family of warpings parameterized by one or multiple parameters, which parameter(s) may be inferred based on one or more evaluations of the objective function. For example, the probabilistic model of the objective function may be specified using a family of cumulative distribution functions of the Beta random variable, parameterized by two positive shape parameters $\alpha$ and $\beta$. Each of the shape parameters $\alpha$ and $\beta$ may be assumed, a priori (i.e., before any evaluations of the objective function are performed), to be distributed (e.g., independently of one another) according to a log-Normal distribution. For example, in some embodiments, the shape parameters $\alpha_d$ and $\beta_d$ of a non-linear warping (e.g., for warping the d'th coordinate of points in the space on which the objective function is defined) of may be assumed to be distributed according to:

$$\log(\alpha_d) \sim \mathcal{N}(\mu_\alpha, \sigma_\alpha) \; \log(\beta_d) \sim \mathcal{N}(\mu_\beta, \sigma_\beta). \tag{20}$$

Accordingly, in some embodiments, the probabilistic model of an objective function may be specified by using a family of non-linear warpings (e.g., family of non-linear warpings specified by placing prior distributions on parameters of a cumulative distribution function of a random variable, such as the Beta random variable). Such a probabilistic model may be used to identify (e.g., locate or approximate the locations of) one or extremal points of an objective function relating values of hyper-parameters of a machine learning system to respective values providing a measure of performance of the machine learning system and/or any objective function arising in any other suitable optimization problem, examples of which have been provided. This may be done in any suitable way and, in some embodiments, may be done by integrating (averaging) out the parameters of the family of non-linear warpings by treating these parameters as parameters of the probability model to be integrated out as was described with reference to process 400 above.

Accordingly, in some embodiments, optimization using an objective function at least in part by using a probabilistic model of the objective function that depends on a non-linear one-to-one mapping may be performed in accordance with process 400, with appropriate modifications (e.g., to step 404 of the process 400) to account for the dependence of the probabilistic model on the non-linear mapping. In particular, the parameters of the family of non-linear warpings (e.g., the scale parameters $\alpha$ and $\beta$ of a Beta CDF) are treated as parameters of the probabilistic model, and the integrated acquisition utility function used to identify points at which to evaluate the objective function is obtained by integrating out at least these parameters of the probabilistic model. More generally, the probabilistic model may comprise two sets of parameters $\theta$ and $\phi$, where the parameters $\phi$ are the parameters of the family of non-linear warpings and $\theta$ are all the other parameters of the probabilistic model and the integrated acquisition utility function may be obtained by integrating an initial acquisition utility function with respect to $\theta$, $\phi$, or $\theta$ and $\phi$.

As was discussed with reference to process 400, in some embodiments, numerical techniques may be used to identify and/or approximate the point at which the integrated acquisition utility function attains its maximum value. Numerical techniques (e.g., rejection sampling, importance sampling, Markov chain Monte Carlo, etc.) may also be needed for this purpose when the probabilistic model depends on parameters of the non-linear one-to-one mapping. One non-liming example of how Monte Carlo techniques may be used to identify and/or approximate the point at which the integrated acquisition utility function attains its maximum value, when the probabilistic model depends on a non-linear mapping, are described below.

Let f(x) denote the objective function and the set X denote the set of points on which the objective function may be calculated. Assuming that the objective function has been evaluated N times, we have as input $\{g(x_n; \phi) \; y_n;$ for $1 \leq n \leq N\}$, where each $x_n$ represents a point at which the objective function has been evaluated, $g(x_n; \phi)$ represents the result of applying a non-linear bijective warping function g, having parameters $\phi$, to the point $x_n$, and $y_n$ represents the corresponding value of the objective function (i.e., $y_n=f(x_n)$). Let p( ) denote the probabilistic model of the objective function that depends on a non-linear one-to-one mapping g, the probabilistic model having parameters $\theta$ (one or more parameters of the probablistic model not including any parameters of the non-linear one-to-one mapping) and $\phi$ (one or more parameters of the non-linear one-to-one mapping). We assume that the parameters $\theta$ and $\phi$ are independent. The integrated acquisition utility function may be approximated by the following numerical procedure.

Initially, for each $1 \leq j \leq J$, draw a sample $(\theta^{(j)}, \phi^{(j)})$ according to:

$$(\theta^{(j)}, \phi^{(j)}) \sim p(\theta, \phi | \{g(x_n; \phi), y_n; \text{ for } 1 \leq n \leq N\}) \tag{21}$$

Any suitable Monte Carlo technique may be used to draw samples according to Equation 21 including, but not limited, to inversion sampling, importance sampling, rejection sampling, and Markov chain Monte Carlo techniques (examples of which have been provided).

Given N samples $\{(\theta^{(j)}, \phi^{(j)}); 1 \leq j \leq J\}$ drawn according to Equation 21, the integrated acquisition utility function may be approximated according to:

$$h(x) \approx \frac{1}{J} \sum_{j=1}^{J} \int_{\mathbb{R}} \psi(y, y^*) p(y | g(x, \phi^{(j)}), \{g(x_n, \phi^{(j)}), y_n\}_{n=1}^{N}, \theta^{(j)}, \phi^{(j)}) dy \tag{22}$$

The approximation of the integrated acquisition utility function computed via Equation 22 may be used to identify a point which is (or is an approximation of) a point x* at which the integrated acquisition utility function attains its maximum value. This may be done in any suitable way. For example, in some embodiments, the integrated acquisition function may be approximated according to Equation 22 on a grid of points and the point on the grid for which the objective function achieves the maximum value may be taken as the point x*. Alternatively, local exploration (e.g., based on the gradient of the warping function) may be performed around one or more points on the grid to identify the point x*. After the point x* is identified, the objective function may be evaluated at x*.

As discussed above, conventional Bayesian optimization techniques require choosing the next point at which to evaluate the objective function (e.g., identify the next set of hyper-parameter values for which to evaluate performance of a machine learning system) based on results of all previous evaluations of the objective function. Each evaluation of the objective function must be completed before the next point at which to evaluate the objective function is identified. Accordingly, all the evaluations of the objective function must performed sequentially (i.e., one at a time), when using conventional Bayesian optimization methods.

In contrast, the technology described herein may be used to parallelize Bayesian optimization techniques so that multiple evaluations of the objective function may be performed in parallel, which is advantageous when each evaluation of the objective function is computationally expensive to preform, as the case may be when identifying hyper-parameter values for machine learning systems that take a long time (e.g., days) to train. Parallel evaluations of the objective function may be performed by using different computer hardware processors. For example, parallel evaluations of the objective function may be performed using different computer hardware processors integrated on a same substrate (e.g., different processor cores) or different computer hardware computer processors not integrated on a same substrate (e.g., different computers, different servers, etc.).

The inventors have recognized that parallelizing conventional Bayesian optimization simply by concurrently evaluating the objective function at different points all of which are chosen based on results of previously-completed evaluations is inefficient because selecting points at which to evaluate the objective function in this way does not take into account any information about pending evaluations of the objective function. Accordingly, in some embodiments, the next point at which to evaluate the objective function is performed based on information about one or pending evaluations of the objective function and one or more previously-completed evaluations of the objective function. For example, the next point at which to evaluate the objective function may be selected prior to completion of one or more previously-initiated evaluations of the objective function, but the selection may be done based on respective likelihoods of potential outcomes of pending evaluations of the objective function so that some information about the pending evaluations (e.g., the particular points at which the evaluation is being performed) is taken into account when selecting the next point at which to evaluate the objective function.

In some embodiments, selecting the next point at which to evaluate the objective function based on one or more pending evaluations of the objective function may be performed using an acquisition utility function that depends on likelihoods of potential outcomes of the pending evaluations of the objective function, the likelihoods determined according to the probabilistic model of the objective function. In some embodiments, selecting the next point at which to evaluate the objective function comprises using an acquisition utility function obtained at least in part by calculating an expected value of an initial acquisition utility function with respect to potential values of the objective function at the plurality of points. The initial acquisition utility function may be a probability of improvement utility function, an expected improvement utility function, a regret minimization utility function, an entropy-based utility function, an integrated acquisition utility function, and/or any other suitable acquisition utility function.

Figure 6:
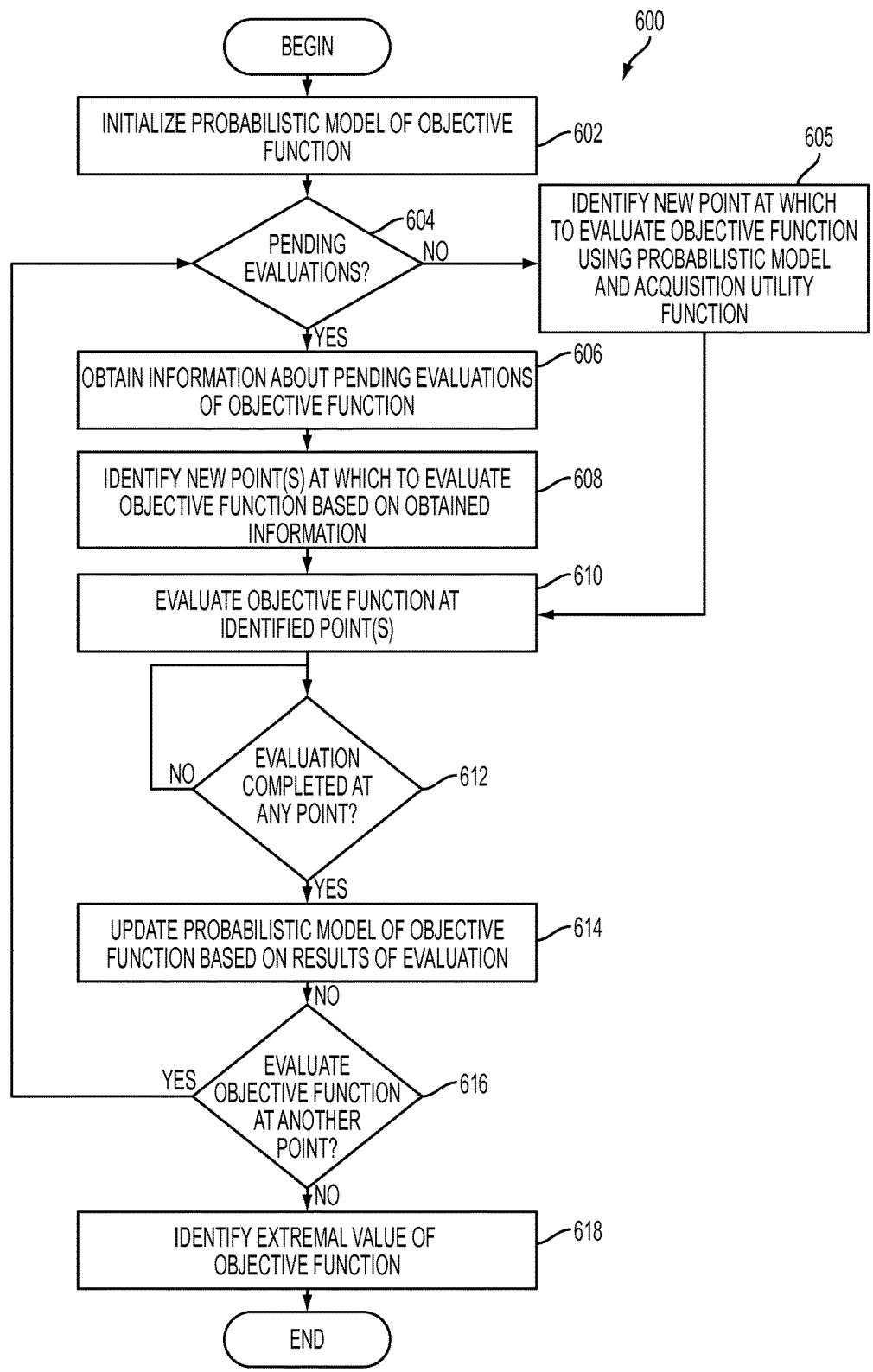
FIG. 6 is a flowchart of an illustrative process for performing optimization using an objective function at least in part by using multiple computer hardware processors, in accordance with some embodiments of the technology described herein.

FIG. 6 is a flowchart of an illustrative process 600 for performing optimization using an objective function at least in part by using multiple computer hardware processors, in accordance with some embodiments of the technology described herein. Process 600 may be used to identify an extremal point (e.g., a local minimum, local maximum, global minimum, global maximum, etc.) of the objective function using the techniques described herein. Process 600 may be performed using different computer hardware processors of any suitable type. For example, at least some (e.g., all) portions of process 600 may be performed using different computer hardware processors integrated on a same substrate (e.g., different processor cores) or different computer hardware computer processors not integrated on a same substrate.

In some embodiments, process 600 may be applied to identifying (e.g., locating or approximating the locations of) one or more extremal points of an objective function relating values of hyper-parameters of a machine learning system to respective values providing a measure of performance of the machine learning system. Process 600 may be used for setting values of hyper-parameters of any of the machine learning systems described herein and/or any other suitable machine learning systems. Additionally or alternatively, process 600 may be applied to identifying (e.g., locating or approximating the locations of) one or more extremal points of an objective function arising in any other suitable optimization problem, examples of which have been provided.

Process 600 begins at act 602, where a probabilistic model of the objective function is initialized. This may be done in any suitable way and, for example, may be done in any of the ways described with reference to act 402 of process 400.

Next process 600 proceeds to decision block 604, where it determined whether there are any pending evaluations of the objective function (i.e., evaluations of the objective function that are pending completion). A pending evaluation may be an evaluation for which a point at which to perform the evaluation has been identified (e.g., the set of hyper-parameter values at which to evaluate performance of a machine learning system has been identified), but the evaluation of the objective function at the identified point has not been started (and, therefore, has not been completed). A pending evaluation may be any evaluation of the objective function that has been started, but has not completed. The determination of whether there are any pending evaluations of the objective function may be performed in any suitable way, as aspects of the technology described herein are not limited by how such a determination may be performed.

When it is determined, at decision block 604, that there are no pending evaluations of the objective function, process 600 proceeds to act 605, where a point at which to evaluate the objective function is identified using a probabilistic model of the objective function and an acquisition utility function. This may be done in any suitable way and, for example, may be done in any of the ways with reference to act 404 of process 400. Any suitable acquisition utility function may be used at act 605 including, for example, any of the acquisition utility functions described herein.

On the other hand, when it is determined at decision block 604 that there are one or more pending evaluations of the objective function, process 600 proceeds to act 606 where information about the pending evaluation(s) is obtained. Information about the pending evaluation(s) may include information identifying the point(s) (e.g., sets of hyper-parameter values) at which the pending evaluation(s) are being (or are to be) performed. Information about the pending evaluation(s) may also include information about the likelihoods of potential outcomes of the pending evaluations(s). Information about the likelihoods of potential outcomes of pending evaluation(s) may be obtained based, at least in part, on the probabilistic model of the objective function.

Next process 600, proceeds to act 608 where one or more new points at which to evaluate the objective function are identified based, at least in part, on information about the pending evaluations obtained at act 608. Any suitable number of points at which to evaluate the objective function may be identified at act 608. For example, when there are M pending evaluations of the objective function (where M is an integer greater than or equal to 1), M points at which to evaluate the objective function may be identified at act 608. Though, in some embodiments, fewer than M points may be identified at act 608. In some embodiments, more than M points may be identified at act 608.

In some embodiments, the point(s) at which to evaluate the objective function are identified based, at least in part, on information identifying the point(s) at which the pending evaluations are being (or are to be) performed. In some embodiments, the point(s) at which to evaluate the objective function are identified further based on likelihoods of potential outcomes of the evaluations of the objective function, which likelihoods are determined based at least in part on the probabilistic model of the objective function.

For example, in some embodiments, the point(s) at which to evaluate the objective function may be identified using an acquisition utility function that depends on information about the pending evaluations and the probabilistic model. The acquisition utility function may depend on the points at which the pending evaluations are being (or are to be) performed and the respective likelihoods of their outcomes acccording to the probabilistic model of the objective function (e.g., according to the predictive distribution induced by the probabilistic model of the objective function).

For example, the following acquisition utility function h(x) may be used to identify point(s) to evaluate as part of act 608:

$$h(x) = \int_R \ldots \int_R \psi(y, \min\{\min_n y_n, \min_m y_m\}) \quad (23)$$
$$p(y, \{y_m\}_{m=1}^M \mid x, \{x_m\}_{m=1}^M, \{x_n, y_n\}_{n=1}^N, \theta) dy dy_1 \ldots dy_M$$

where the set $\{x_n, y_n; 1 \le n \le N\}$ corresponds to N previously-completed evaluations (both the points at which the objective function was evaluated and results of the evaluations are available for previously-completed evaluations), the set $\{x_m; 1 \le m \le M\}$ corresponds to M pending evaluations (points at which the objective function is being or is to be evaluated are available for pending evaluations), p( ) is the probabilistic model of the objective function, and $\psi(y,y^*)$ corresponds to a selection heuristic (e.g., as described above with reference to Equations 14 and 15). Accordingly, the acquisition utility function of Equation 23 is calculated as an expected value of an initial acquisition utility function (specified via the selection heuristic $\psi(y,y^*)$) with respect to potential values of the objective function at the plurality of points $\{x_m; 1 \le m \le M\}$.

In some embodiments, when multiple points at which to evaluate the objective function are identified at act 608, the points may be identified one at a time, and the acquisition utility function (e.g., the acquisition utility function shown in Equation 23) may be updated after each point is identified. For example, after a first point is selected at act 608, a second point may be selected using an acquisition utility function that depends on information identifying the first point.

In some embodiments, a new point at which to evaluate the objective function may be identified at act 608 as the point (or as approximation to the point) at which the acquisition utility function attains its maximum value. In some embodiments, the point at which the acquisition function attains its maximum may be identified exactly (e.g., when the acquisition utility function is available in closed form). In some embodiments, however, the point at which the acquisition utility function achieves its maximum value may be not be identified exactly (e.g., because acquisition utility function is not available in closed form), in which case the point at which the acquisition utility function attains its maximum value may be identified or approximated using numerical techniques.

For example, in some embodiments, the acquisition utility function of Equation 23 may be approximated via a Monte Carlo estimate according to:

$$h(x) \approx \frac{1}{J} \sum_{j=1}^J \int_R \psi(y, \min\{\min_n y_n, \min_m y_m^{(j)}\}) \quad (24)$$
$$p(y \mid \{x_m, y_m^{(j)}\}_{m=1}^M, \{x_n, y_n\}_{n=1}^N, \theta) dy.$$

where $y_m^{(j)}$ is a sample from the M-dimensional predictive distribution induced by $p(y|\{x_m, y_m^{(j)}\}_{m=1}^M, \{x_n, y_n\}_{n=1}^N, \theta)$. When the probabilistic model comprises a Gaussian process, the predictive distribution is Gaussian and the $y_m^{(j)}$ may be generated by simulating from the Gaussian distribution with the appropriate parameters. For other probabilistic models, other numerical techniques may be used including, but not limited to, Monte Carlo techniques such as rejection sampling, importance sampling, Markov chain Monte Carlo, etc.

It should be appreciated that the point at which to evaluate the objective function is not limited to being a point (or an approximation to the point) at which the acquisition utility function attains its maximum and may be any other suitable point obtained by using the acquisition utility function (e.g., a local maximum of the acquisition utility function, a local or a global minimum of the acquisition utility function, etc.).

After one or more point(s) at which to evaluate the objective function are identified at act 608, process 600 proceeds to act 610, where evaluation of the objective function at the identified point(s) is initiated. This may be done in any suitable way. For example, in some embodiments, when multiple points are identified at act 608, the evaluation of the objective function at the identified points may be initiated such that the objective function is evaluated using different computer hardware processors (e.g., when first and second points are identified at act 608, evaluation of the first and second points may be initiated such that the objective function is evaluated at the first point using a first computer hardware processor and at the second point using a second computer hardware processor different from the first computer hardware processor).

Next process 600 proceeds to decision block 612, where it is determined whether evaluation of the objective function at any point is completed. This determination may be done in any suitable way. When it is determined that the evaluation of the objective function is not completed at any point, the process 600 waits for evaluation to be completed at least at one point. On the other hand, when it is determined that the evaluation of the objective function is completed at one or more points, process 600 proceeds to act 614 where the probabilistic model of the objective function is updated based on results of the completed evaluations. The probabilistic model may be updated in any suitable way and, for example, may be updated in any of the ways described with reference to act 408 of process 400.

After the probabilistic model of the objective function is updated at act 614, process 600 proceeds to decision block

616, where it is determined whether the objective function is to be evaluated at another point. This determination may be made in any suitable way and, for example, may be made in any of the ways described with reference to decision block 410 of process 400.

When it is determined, at decision block 616, that the objective function is to be evaluated again, process 600 returns, via the YES branch, to decision block 604, and acts/decision blocks 604-612 are repeated. On the other hand, when it is determined at decision block 616 that the objective function is not to be evaluated again, process 600 proceeds to act 618, where an extremal value of the objective function may be identified based on the one or more values of the objective function obtained during process 600.

At act 618, an extremal value of the objective function may be identified in any suitable way based on the obtained value(s) of the objective function and, for example, may be identified in any of the ways described with reference to act 412 of process 400. After the extremal value of the objective function is identified at act 618, process 600 completes.

As discussed above, some embodiments are directed to Bayesian optimization techniques that, when applied to a particular optimization task, can take advantage of information obtained while applying the Bayesian optimization techniques to one or more related optimization tasks. These techniques are referred to herein as "multi-task" Bayesian optimization techniques. The multi-task optimization techniques described herein may be applied to various types of problems, examples of which are provided below.

As one non-limiting example, in some embodiments, the multi-task Bayesian optimization techniques described herein may be applied to the task of identifying values of hyper-parameters for a particular machine learning system and, to this end, may use information previously obtained while (performing the related task of) identifying values of hyper-parameters for a related machine learning system. The related machine learning system may be any machine learning system that shares one or more (e.g., all) hyper-parameters with the particular machine learning system. For example, the particular machine learning system may comprise a first neural network having a first set of hyper-parameters and the related machine learning system may comprise a second neural network (e.g., a neural network having a different number of layers from the first neural network, a neural network having a different non-linearity from the first neural network, the first and second neural networks may be the same, etc.) having a second set of hyper-parameters such that the first and second sets of hyper-parameters share at least one hyper-parameter. In addition, even if the first and second sets of hyper-parameters don't overlap, a joint space of parameter may be created, in any suitable way. For example, a 'default' value for each parameter may be inferred, so that if that parameter is absent for a particular model then the default value may be used. In this way, each neural network may have the same set of hyper-parameters, such that any standard kernel may be applied.

Information previously-obtained while identifying hyper-parameters of a related machine learning system may comprise results of evaluating performance of the related machine learning system for one or more sets of hyper-parameter values. Such information may indicate how the related machine learning system (e.g., the system comprising the second neural network) performed for various hyper-parameter values and, as a result, this information may be used to guide the search for hyper-parameter values for the particular machine learning system (e.g., the system comprising the first neural network).

It should be appreciated that the multi-task optimization techniques described herein are not limited to using previously-obtained information from a completed optimization task (e.g., information obtained from performing the completed task of identifying hyper-parameters for a machine learning system—completed in the sense that hyper-parameter values to use have been identified and the machine learning system has been configured for use with the identified hyper-parameter values). In some embodiments, the multi-task optimization techniques described herein may be applied to multiple related optimization techniques being solved concurrently. In such embodiments, the multi-task optimization techniques described herein may involve evaluation of multiple different objective functions, each objective function corresponding to a respective optimization task. Because the tasks are related, results of evaluating one objective function corresponding to one task may be used to guide selection of a point at which to evaluate another objective function corresponding to another related task.

As one non-limiting example, in some embodiments, the multi-task Bayesian optimization techniques described herein may be applied to the problem of estimating an average value of an objective function that may be expressed as a combination of objective functions each of which corresponds to a respective one of multiple related tasks. Such a problem arises in various settings including, for example, when identifying hyper-parameters of a machine learning system that would optimize performance of the machine learning system, where the performance of the machine learning system is obtained by applying T-fold cross validation, which is a technique for estimating generalization error of machine learning systems.

In T-fold cross-validation, the data used to train a machine learning system is partitioned into T subsets, termed "folds," and the measure of performance of a machine learning system is calculated as the average performance of the machine learning system across the T folds. The performance of the machine learning system for a particular fold is obtained by training the machine learning system on data in all other folds and evaluating the performance of the system on data in the particular fold. Accordingly, to evaluate the performance of the machine learning system for a particular set of hyper-parameter values, the machine learning system must be trained T times, which is computationally expensive for complex machine learning systems and/or large datasets. However, it is likely that the measures of performance associated with each of the T folds are correlated with one another, such that evaluating the performance of the machine learning system for a particular fold using a set of hyper-parameter values may provide information indicating the performance of the machine learning system for another fold using the same set of hyper-parameter values. As a result, performance of the machine learning system may not need to be evaluated for each one of T folds for each set of hyper-parameter values.

Accordingly, in some embodiments, the multi-task optimization techniques described herein may be applied to the problem of T-fold cross-validation by re-formulating this problem as a multi-task optimization problem where each task corresponds to identifying a set of hyper-parameter values to optimize performance of the machine learning system for a particular cross-validation fold (i.e., for a respective subset of the data used to train the machine learning system). The objective function for a task relates hyper-parameter values of the machine learning system to performance of the machine learning system for the cross-validation fold associated with the task (e.g., the objective function for the task associated with cross-validation fold t relates values of hyper-parameters of the machine learning system to performance of the machine learning system calculated by training the machine learning system on data in all folds other than fold t and evaluating the performance of the resulting trained machine learning system on data in fold t.) Accordingly, it should be appreciated that multi-task optimization techniques described herein may be used to maximize a single objective function that may be specified as a function of multiple other objective functions (e.g., which may be termed "sub-objective" functions).

As another non-limiting example, in some embodiments, the multi-task Bayesian optimization techniques described herein may be applied to the problem of concurrently solving multiple related optimization tasks, where the objective function associated with one of the tasks may be cheaper to evaluate than the objective function associated with another task. When two tasks are related, then evaluations of the objective function for one task may reveal information and reduce uncertainty about the location of one or more extremal points of the objective function for another task. For example, an objective function associated with the task "A" of identifying hyper-parameter values to optimize performance of a machine learning system on a large set of data (e.g., 10 million data points) is more expensive to evaluate (for each set of hyper-parameter values) than an objective function associated with the related task "B" of identifying hyper-parameter values to optimize performance of a machine learning system on a subset of the data (e.g., 10,000 of the 10 million data points). However, since the tasks are related (one is task is a coarser version of the other, much like annealing), evaluations of the objective function for task "B" may reveal information about which hyper-parameter values to try to evaluate for task "A," thereby reducing the number of computationally expensive evaluations of the objective function for task "A."

As another non-limiting example, in some embodiments, the multi-task Bayesian optimization techniques described herein may be applied to identifying a value of a hyper-parameter of a machine learning system that takes on discrete values which are not ordered in any natural way (a categorical parameter). One non-limiting example of such a hyper-parameter for a machine learning system is the type of non-linearity used in a neural network (e.g., a hyperbolic tangent nonlinearity, a sigmoid nonlinearity, etc.). Another non-limiting example of such a hyper-parameter for a machine learning system is the type of kernel used in a support vector machine. Still another non-limiting example of such a hyper-parameter is a parameter selecting a training algorithm for a machine learning system from among a set of different training algorithms that may be used to train the machine learning system on a same set of data. The multi-task optimization techniques may be applied to such problems by generating a set of related tasks having a task for each value of the categorical hyper-parameters. Each task comprises identifying values of all hyper-parameters of a machine learning system, other than the values of the one or more categorical hyper-parameters the values of which are set for each task to one of the possible sets of values (e.g., one task may comprise identifying values of hyper-parameters of a neural network using a hyperbolic tangent as the activation function and another related task may comprise identifying values of the neural network using a sigmoid as the activation function).

It should be appreciated that the above examples of problems to which the multi-task Bayesian optimization techniques described herein may be applied are illustrative and non-limiting, as the multi-task techniques described herein may be applied to any other suitable set of optimization tasks.

In some embodiments, multi-task optimization techniques may comprise using a joint probabilistic model to jointly model multiple objective functions, each of the objective functions corresponding to one of multiple related tasks. As discussed above, the multi-task optimization techniques may be applied to any suitable set of related optimization tasks. As one non-limiting example, each task may comprise identifying hyper-parameters to optimize performance of the same machine learning system for a set of data associated with the task and used to train the machine learning system given a set of hyper-parameter values. As another non-limiting example, one of the multiple related tasks may comprise identifying hyper-parameters to optimize performance of one machine learning system for a first set data associated, and another task of the multiple related tasks may comprise identifying hyper-parameters to optimize performance of another related machine learning system for a second set data (the first set of data may be different from or the same as the second set of data). In each of these examples, the objective function corresponding to a particular task may relate hyper-parameter values of the machine learning system to its performance.

In some embodiments, the joint probabilistic model of multiple objective functions may model correlation among tasks in the plurality of tasks. In some embodiments, the joint probabilistic model may comprise one or more parameters to model correlation among tasks in the plurality of tasks (e.g., one or more parameters for specifying a correlation or covariance kernel). Values of these parameter(s) may be estimated based on results of evaluation of objective functions corresponding to the plurality of tasks. The values of the parameter(s) may be updated when one or more additional evaluations of any of the multiple objective functions are performed. In this way, the parameter(s) of the joint probabilistic model that model correlation among tasks in the plurality of tasks may be adaptively estimated.

For example, in some embodiments, the joint probabilistic model of the multiple objective functions may comprise a covariance kernel which may model correlation among tasks in the plurality of tasks. In some embodiments, the covariance kernel ($K_{mult}$) may be obtained based, at least in part, on a first covariance kernel ($K_t$) modeling correlation among tasks in the plurality of tasks and a second covariance kernel ($K_x$) modeling correlation among points at which objective functions in the plurality of objective functions may be evaluated. The covariance kernel may be calculated from the first and second covariance kernels according to:

$$K_{multi}((x,t),(x',t')) = K_t(t,t') \otimes K_x(x,x') \qquad (25)$$

where $\otimes$ represents the Kronecker product.

In some embodiments, the joint probabilistic model of the multiple objective functions may comprise a vector-valued Gaussian process which may be used to model "multi-objective" functions $f$ mapping values in the domain X to the range $R^T$, where R is the set of real numbers and T is an integer greater than or equal to two. The domain X may be multi-dimensional. Accordingly, each multi-objective function f modeled by a vector-valued Gaussian process maps inputs into T outputs corresponding to T related tasks, with each of the T outputs being an output for a corresponding task. In some embodiments, the covariance kernel of the Gaussian process may be given by Equation (25), with the kernel $K_x$ specified via any one of the kernel functions described herein (e.g., Matérn kernel). Though it should be appreciated that the joint probabilistic model of the multiple objective functions is not limited to comprising a Gaussian process and may comprise any other suitable probabilistic model.

In some embodiments, the kernel $K_t$ may be estimated from evaluations of the multiple objective functions. Any suitable estimation technique may be used to estimate the kernel $K_t$. For example, in some embodiments, slice sampling (or any other suitable Monte Carlo technique) may be used to estimate a Cholesky factor of the kernel $K_t$. In some embodiments, the kernel $K_t$ is estimated subject to the constraint that the related tasks are positively correlated. In such embodiments, the elements of $K_t$ may be estimated in log space and suitably exponentiated so that this constraint is satisfied. It should be appreciated that any suitable parameterization of a covariance kernel may be used, as aspects of the technology described herein are not limited to any one parameterization (e.g., Cholesky) of the covariance kernel.

Figure 7:
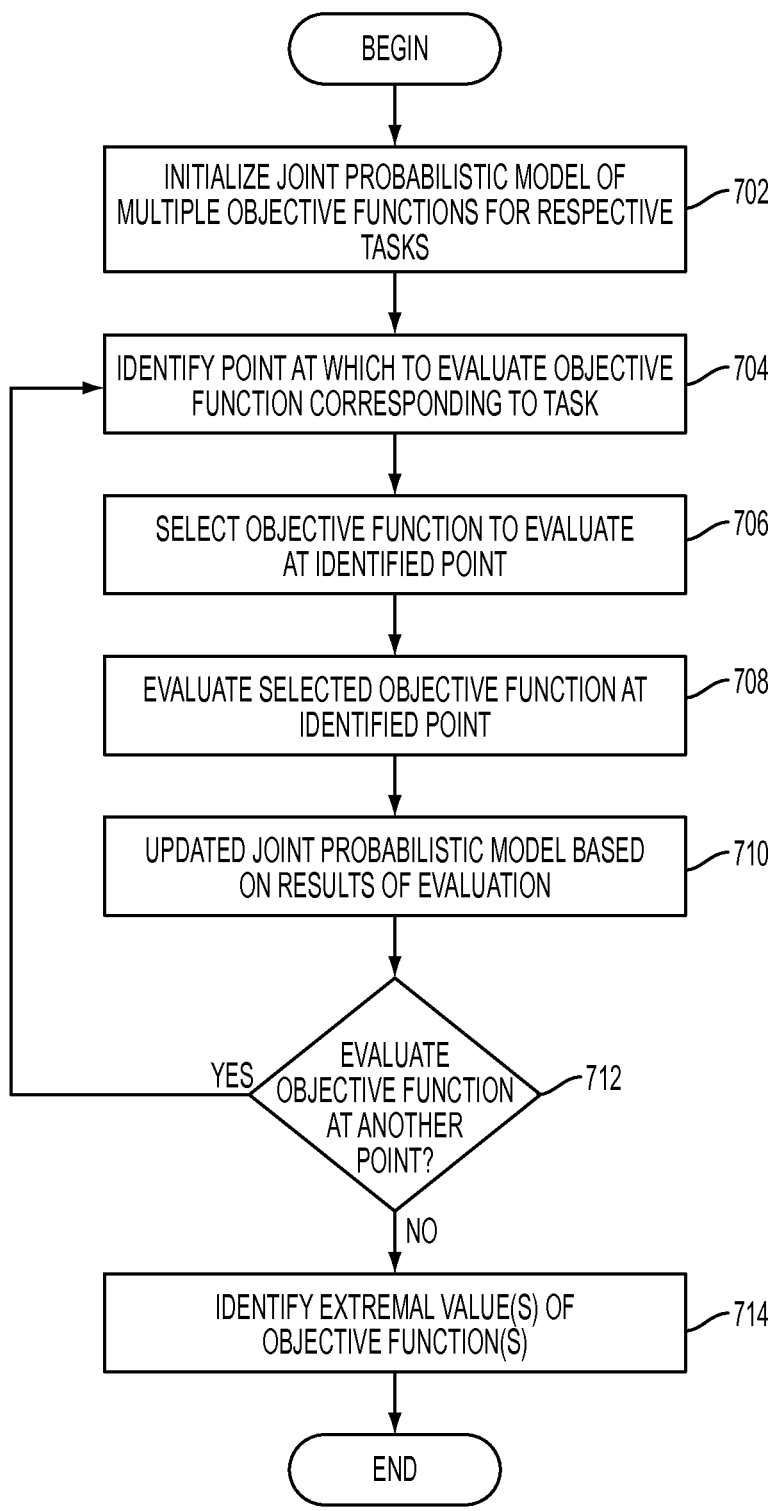
FIG. 7 is a flowchart of an illustrative process for performing multi-task optimization at least in part by using a joint probabilistic model of multiple objective functions corresponding to respective tasks, in accordance with some embodiments of the technology described herein.

FIG. 7 is a flowchart of an illustrative process 700 for performing multi-task Bayesian optimization using a set of objective functions, each of the objective functions in the set being associated with a respective task in a set of related tasks. The set of functions may comprise any suitable number of functions (e.g., two, three, five, at least two, at least five, at least ten, at least 25, at least 50, between 2 and 25, between 10 and 100, etc.). Process 700 may be used to identify an extremal point (e.g., a local minimum, local maximum, global minimum, global maximum, etc.) of each of one or more of the objective functions using the techniques described herein.

Process 700 may be performed one or multiple computer hardware processors, as aspects of the technology described herein are not limited in this respect. When process 700 is performed using multiple computer hardware processors, its execution may be parallelized over the multiple processors in accordance with the techniques described above with reference to FIG. 6.

In some embodiments, process 700 may be applied to identifying (e.g., locating or approximating the locations of) one or more extremal points of one or more objective functions relating values of hyper-parameters of a machine learning system to respective values providing a measure of performance of the machine learning system. Process 700 may be used for setting values of hyper-parameters of any of the machine learning systems described herein and/or any other suitable machine learning systems. Additionally or alternatively, process 700 may be applied to identifying (e.g., locating or approximating the locations of) one or more extremal points of one or more objective function arising in any other suitable related optimization tasks.

Process 700 begins at act 702, where a joint probabilistic model of the objective functions in the set of objective functions is initialized. The joint probabilistic model may be any suitable probabilistic model. As one non-limiting example, in some embodiments, the joint probabilistic model may comprise a vector-valued Gaussian process specified using a covariance kernel given by Equation (25). However, in other embodiments, the Gaussian process may be specified using any other suitable kernel and, in yet other embodiments, the joint probabilistic model may not comprise a Gaussian process and may instead comprise a neural network, an adaptive basis function regression model (with the functions having multiple outputs), or any other suitable probabilistic model. The joint probabilistic model may be initialized in any suitable way (e.g., as described with reference to act 402 of process 400), as aspects of the technology described herein are not limited by the way in which the joint probabilistic model of multiple objective functions is initialized.

Next process 700 proceeds to act 704, where a point is identified at which to evaluate some objective function in the set of objective functions. The point may be identified based at least in part by using the joint probabilistic model of the objective functions and an acquisition utility function (which may depend on the joint probabilistic model of the objective function). Any of numerous types of acquisition utility functions may be used after being suitably generalized to the multi-task setting. As one non-limiting example, in some embodiments, the entropy-search acquisition function (see e.g., Equation 9) may be generalized to the multi-task case and the point at which to evaluate an objective function in the set of objective functions may be identified based on the joint probabilistic model and the generalized entropy-search acquisition function.

In some embodiments, the entropy-search acquisition function may be generalized to take into account the computational cost of evaluating the objective functions in the set of objective functions. The resultant acquisition function $a_{IG}(x)$, termed a cost-weighted entropy search acquisition utility function may be computed according to:

$$a_{IG}(x^t) = \int \int \left( \frac{H[P_{min}] - H[P_{min}^y]}{c_t(x)} \right) p(y \mid f) p(f \mid x^t) dy df \qquad (26)$$

where, p( ) is the joint probabilistic model of objective functions in the set of objective functions, $P_{min}^y$ indicates that the fantasized observation $\{x^t, y\}$ has been added to the set of observations, where $x^t$ is a fantasized point at which the objective function associated with the t-th task may be evaluated, the value of the objective function at $x^t$ is fantasized when evaluating the entropy search acquisition function, $p(f|x^t)$ represents $p(f|x^t, \theta, \{x_n^t, y_n^t; 1 \leq n \leq N\})$, H(P) represents entropy of P, $P_{min}$ represents Pr(min at $x^t|\theta, \tilde{X}, \{x_n^t, y_n^t; 1 \leq n \leq N\})$, and where each $x_n^t$ corresponds to a point at which the objective function associated with the t-th task has been evaluated to obtain result of the evaluation $y_n^t$. The function $c_t(x)$ represents the cost of evaluating the objective function associated with the t-th task at point x. This cost function may be known in advance or, in some embodiments, may be estimated based one or more evaluations of the objective functions in the set of objective functions (along with information indicating how long each such evaluation took to complete). The cost-weighted entropy search acquisition function may reflect the information gain (from evaluating the t'th objective function at point x) per unit cost of evaluating a candidate point.

The point at which to evaluate an objective function in the set of objective functions may be identified as the point (or as approximation to the point) at which the acquisition utility function (e.g., the cost-weighted entropy search acquisition utility function) attains its maximum value. In some embodiments, the point at which the acquisition function attains its maximum may be identified exactly (e.g., when the acquisition utility function is available in closed form). In some embodiments, however, the point at which the acquisition utility function achieves its maximum value may be not be identified exactly (e.g., because acquisition utility function is not available in closed form), in which case the point at which the acquisition utility function attains its maximum value may be identified or approximated using numerical techniques. For example, the cost-weighted entropy search acquisition utility function may not be available in closed form and Monte Carlo techniques (e.g., rejection sampling, importance sampling, Markov chain Monte Carlo, etc.) may be employed to identify or approximate the point at which the integrated acquisition utility function attains its maximum value.

It should be appreciated that the point at which to evaluate an objective function in the set of objective functions is not limited to being a point (or an approximation to the point) at which the acquisition utility function attains its maximum and may be any other suitable point obtained by using the acquisition utility function (e.g., a local maximum of the acquisition utility function, a local or a global minimum of the acquisition utility function, etc.).

After the point at which to evaluate an objective function in the set of objective functions is identified at act 704, process 700 proceeds to act 706, where an objective function is selected from the set of objective functions to be evaluated at the point identified at act 704. The objective function to be evaluated at the identified point may be selected based, at least in part, on the joint probabilistic model. As one non-limiting example, the objective function to be evaluated is selected to be the objective function that is most likely, according to the joint probabilistic model, to generate the largest corresponding value at the identified point.

Next, process 700 proceeds to act 708, where the objective function selected at act 706 is evaluated at the point identified at act 704. Next, process 700 proceeds to act 710, where the joint probabilistic model may be updated based on results of the evaluation performed at act 708 to obtain an updated joint probabilistic model.

The joint probabilistic model may be updated in any of numerous ways based on results of the new evaluation obtained at act 708. For example, updating the joint probabilistic model may comprise updating (e.g., re-estimating) one or more parameters of the probabilistic model based on results of the evaluation performed at act 708. As one non-limiting example, updating the joint probabilistic model may comprise updating one or more parameters in the joint probabilistic model used to model correlation among tasks in the plurality of tasks (e.g., one or more parameters for specifying a correlation or covariance kernel). As another non-limiting example, updating the joint probabilistic model may comprise updating one or more parameter of the acquisition utility function (e.g., one or more parameters of cost-weighted entropy search acquisition function $c_t(x)$). Additionally or alternatively, the joint probabilistic model may be updated in any of the ways described with reference to act 408 of process 400 and/or in any other suitable way.

After the joint probabilistic model is updated at act 710, process 700 proceeds to decision block 712, where it is determined whether any of the objective functions in the set of objective functions are to be evaluated at another point. This determination may be made in any suitable way. For example, this determination may be made for each of the objective functions in the set of objective functions in any of the ways described with reference to decision block 410 of process 400, and if it is determined that any one of the objective functions is to be updated, process 700 loops back to act 704 via the "YES" branch, and acts 704-710 and decision block 712 are repeated.

On the other hand, if it is determined that none of the objective functions in the set of objective functions is to be updated, process 700 proceeds via the "NO" branch to act 714, where an extremal value of one or more of the objective functions in the set of objective functions may be identified. The extremal value of an objective function in the set of objective functions may be found in any suitable way and, for example, may be found in any of the ways described with reference to act 412 of process 400. After the extremal value of one or more of the objective functions is identified at act 714, process 700 completes.

It should be appreciated that process 700 is illustrative and that many variations of process 700 are possible. For example, although in the illustrated embodiment a point at which to evaluate some objective function was identified first at act 704, and an objective function to be evaluated at the identified point was selected second at act 706, in other embodiments the order of these two steps may be reversed. Accordingly, in some embodiments, a task for which to evaluate an objective function may be selected first and a point at which to evaluate the selected task may be identified second.

As another example, the joint probabilistic model of the objective functions may be specified using one or more non-linear mappings (e.g., each task may be associated with a respective non-linear mapping), which may be useful in a variety of problems. For example, when training a machine learning system on different data sets, the size of the dataset may have an effect on which hyper-parameter settings will lead to good performance of the machine learning system. For instance, a machine learning system trained using a small dataset may require more regularization that in a case where the same machine learning system is trained on a larger dataset (e.g., such that the hyper-parameters indicating an amount of regularization may be different for machine learning systems trained on small and large amounts of data). More generally, it is possible that one part of the input space of one task can be correlated with a different part of the input space on the other task. Allowing each task to be associated with its own respective non-linear warping (e.g., as was described above for a single task) may allow the joint probabilistic model to account for such inter-task correlation. Inferring the parameters associated with the non-linear warpings (e.g., the parameters of associated cumulative distribution functions, etc.) may warp the tasks into a jointly stationary space more suitably modeled by a stationary multi-task model (e.g., a multi-task model specified using a stationary vector-valued Gaussian process).

Figure 8:
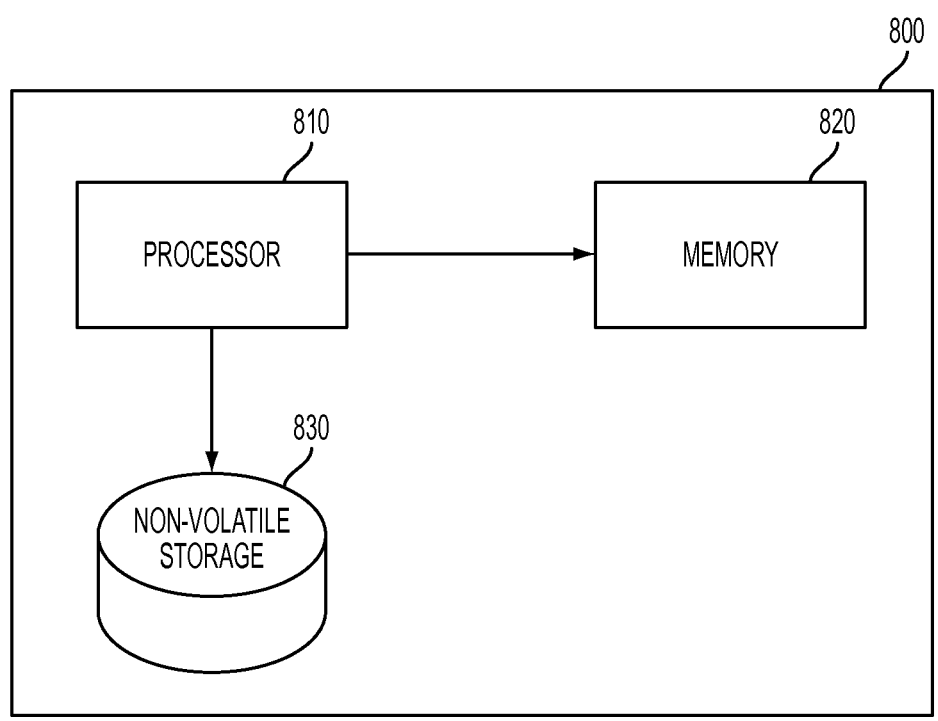
FIG. 8 is a block diagram of an illustrative computer system on which embodiments described herein may be implemented.

An illustrative implementation of a computer system 800 that may be used in connection with any of the embodiments of the technology described herein is shown in FIG. 8. The computer system 800 may include one or more processors 810 and one or more articles of manufacture that comprise non-transitory computer-readable storage media (e.g., memory 820 and one or more non-volatile storage media 830). The processor 810 may control writing data to and reading data from the memory 820 and the non-volatile storage device 820 in any suitable manner, as the aspects of the technology described herein are not limited in this respect. To perform any of the functionality described herein, the processor 810 may execute one or more processor-executable instructions stored in one or more non-transitory computer-readable storage media (e.g., the memory 820), which may serve as non-transitory computer-readable storage media storing processor-executable instructions for execution by the processor 810.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the technology described herein need not reside on a single computer or processor, but may be distributed in a modular fashion among different computers or processors to implement various aspects of the technology described herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (FIGS. 4, 6, and 7) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

What is claimed is:

1. A system for optimizing performance of a machine learning system having multiple hyper-parameters, the system comprising:
    at least one computer hardware processor; and
    at least one non-transitory computer-readable storage medium storing processor-executable instructions that, when executed by the at least one computer hardware processor, cause the at least one computer hardware processor to perform:
        identifying a first set of hyper-parameter values at which to evaluate an objective function that relates hyper-parameter values of the machine learning system to values providing a measure of performance of the machine learning system;
        beginning evaluation of the objective function at the first set of hyper-parameter values at least in part by executing the machine learning system with the multiple hyper-parameters set to the first set of hyper-parameter values to obtain a first value corresponding to the first set of hyper-parameter values;
        before evaluating the objective function at the first set of hyper-parameter values is completed:
            determining likelihoods of potential outcomes of evaluating the objective function at the first set of hyper-parameter values using a probabilistic model of the objective function;
            identifying, based on the likelihoods of the potential outcomes, a second set of hyper-parameter values different from the first set of hyper-parameter values at which to evaluate the objective function; and
            beginning evaluation of the objective function at the second set of hyper-parameter values at least in part by executing the machine learning system with the multiple hyper-parameters set to the second set of hyper-parameter values to obtain a second value corresponding to the second set of hyper-parameter values;
        selecting one of the first and second sets of hyper-parameter values based at least on the first value corresponding to the first set of hyper-parameter values and the second value corresponding to the second set of hyper-parameter values; and
        configuring the machine learning system with the selected set of hyper-parameter values that optimizes the machine learning system.

2. The system of claim 1, wherein the objective function relates values of a plurality of hyper-parameters of a neural network for identifying objects in images to respective values providing a measure of performance of the neural network in identifying the objects in the images.

3. The system of claim 1, wherein the at least one computer hardware processor comprises a first computer hardware processor and a second computer hardware processor different from the first computer hardware processor, and wherein the processor-executable instructions cause:
    at least the first computer hardware processor to perform evaluation of the objective function at the first set of hyper-parameter values; and
    at least the second computer hardware processor to perform evaluation of the objective function at the second set of hyper-parameter values.

4. The system of claim 1, wherein the identifying comprises using an acquisition utility function obtained at least in part by calculating an expected value of an initial acquisition utility function with respect to potential values of the objective function at the first set of hyper-parameter values.

5. The system of claim 1, wherein the likelihoods are obtained using the probabilistic model of the objective function, and wherein the processor-executable instructions further cause the at least one computer hardware processor to perform:
    updating the probabilistic model of the objective function using results of evaluating the objective function at the first set of hyper-parameter values and/or the second set of hyper-parameter values to obtain an updated probabilistic model of the objective function.

6. The system of claim 5, wherein the processor-executable instructions further cause the at least one computer hardware processor to perform:
    identifying, using the updated probabilistic model of the objective function, at least a third set of hyper-parameter values at which to evaluate the objective function; and beginning evaluation of the objective function at least at the identified third set of hyper-parameter values at least in part by executing the machine learning system with the multiple hyper-parameters set to the third set of hyper-parameter values to obtain a third value corresponding to the third set of hyper-parameter values.

7. The system of claim 5, wherein the probabilistic model of the objective function comprises a Gaussian process.

8. The system of claim 1, wherein the probabilistic model of the objective function comprises a neural network.

9. The system of claim 1, wherein identifying the first set of hyper-parameter values at which to evaluate the objective function comprises using an integrated acquisition utility function and the probabilistic model of the objective function, wherein the integrated acquisition function is obtained by integrating multiple acquisition functions.

10. A method for optimizing performance of a machine learning system having multiple hyper-parameters, the method comprising:
using at least one computer hardware processor to perform:
identifying a first set of hyper-parameter values at which to evaluate an objective function that relates hyper-parameter values of the machine learning system to values providing a measure of performance of the machine learning system;
beginning evaluation of the objective function at the first set of hyper-parameter values at least in part by executing the machine learning system with the multiple hyper-parameters set to the first set of hyper-parameter values to obtain a first value corresponding to the first set of hyper-parameter values;
before evaluating the objective function at the first set of hyper-parameter values is completed:
determining likelihoods of potential outcomes of evaluating the objective function at the first set of hyper-parameter values using a probabilistic model of the objective function;
identifying, based on likelihoods of potential outcomes of evaluating the objective function at the first point, a second set of hyper-parameter values different from the first set of hyper-parameter values at which to evaluate the objective function; and
beginning evaluation of the objective function at the second set of hyper-parameter values at least in part by executing the machine learning system with the multiple hyper-parameters set to the second set of hyper-parameter values to obtain a second value corresponding to the second set of hyper-parameter values;
selecting one of the first and second sets of hyper-parameter values based at least on the first value corresponding to the first set of hyper-parameter values and the second value corresponding to the second set of hyper-parameter values; and
configuring the machine learning system with the selected set of hyper-parameter values that optimizes the machine learning system.

11. The method of claim 10, wherein the objective function relates values of a plurality of hyper-parameters of a neural network for identifying objects in images to respective values providing a measure of performance of the neural network in identifying the objects in the images.

12. The method of claim 10, wherein the at least one computer hardware processor comprises a first computer hardware processor and a second computer hardware processor different from the first computer hardware processor, and wherein the method comprises:
using at least the first computer hardware processor to perform evaluation of the objective function at the first set of hyper-parameter values; and
using at least the second computer hardware processor to perform evaluation of the objective function at the second set of hyper-parameter values.

13. The method of claim 10, wherein the identifying comprises using an acquisition utility function obtained at least in part by calculating an expected value of an initial acquisition utility function with respect to potential values of the objective function at the first set of hyper-parameter values.

14. The method of claim 10, wherein the likelihoods are obtained using the probabilistic model of the objective function, and wherein the method further comprises:
updating the probabilistic model of the objective function using results of evaluating the objective function at the first set of hyper-parameter values and/or the second set of hyper-parameter values to obtain an updated probabilistic model of the objective function.

15. The method of claim 10, wherein the probabilistic model of the objective function comprises a Gaussian process.

16. At least one non-transitory computer-readable storage medium storing processor executable instructions that, when executed by at least one computer hardware processor, cause the at least one computer hardware processor to perform a method for optimizing performance of a machine learning system having multiple hyper-parameters, the method comprising:
identifying a first set of hyper-parameter values at which to evaluate an objective function that relates hyper-parameter values of the machine learning system to values providing a measure of performance of the machine learning system;
beginning evaluation of the objective function at the first set of hyper-parameter values at least in part by executing the machine learning system with the multiple hyper-parameters set to the first set of hyper-parameter values to obtain a first value corresponding to the first set of hyper-parameter values;
before evaluating the objective function at the first set of hyper-parameter values is completed:
determining likelihoods of potential outcomes of evaluating the objective function at the first set of hyper-parameter values using a probabilistic model of the objective function;
identifying, based on likelihoods of potential outcomes of evaluating the objective function at the first point, a second set of hyper-parameter values different from the first set of hyper-parameter values at which to evaluate the objective function; and
beginning evaluation of the objective function at the second set of hyper-parameter values at least in part by executing the machine learning system with the multiple hyper-parameters set to the second set of hyper-parameter values to obtain a second value corresponding to the second set of hyper-parameter values;
selecting one of the first and second sets of hyper-parameter values based at least on the first value corresponding to the first set of hyper-parameter values and the second value corresponding to the second set of hyper-parameter values; and configuring the machine learning system with the selected set of hyper-parameter values that optimizes the machine learning system.

17. The at least one non-transitory computer-readable storage medium of claim 16, wherein the objective function relates values of a plurality of hyper-parameters of a neural network for identifying objects in images to respective values providing a measure of performance of the neural network in identifying the objects in the images.

18. The at least one non-transitory computer-readable storage medium of claim 16, wherein the at least one computer hardware processor comprises a first computer hardware processor and a second computer hardware processor different from the first computer hardware processor, and wherein the processor-executable instructions cause:
   at least the first computer hardware processor to perform evaluation of the objective function at the first set of hyper-parameter values; and
   at least the second computer hardware processor to perform evaluation of the objective function at the second set of hyper-parameter values.

19. The at least one non-transitory computer-readable storage medium of claim 16, wherein the identifying comprises using an acquisition utility function obtained at least in part by calculating an expected value of an initial acquisition utility function with respect to potential values of the objective function at the first set of hyper-parameter values.

20. The at least one non-transitory computer-readable storage medium of claim 16, wherein the likelihoods are obtained using the probabilistic model of the objective function, and wherein the processor-executable instructions further cause the at least one computer hardware processor to perform:
   updating the probabilistic model of the objective function using results of evaluating the objective function at the first set of hyper-parameter values and/or the second set of hyper-parameter values to obtain an updated probabilistic model of the objective function.

21. The at least one non-transitory computer-readable storage medium of claim 16, wherein the probabilistic model of the objection function comprises a Gaussian process.

* * * * *